(12) United States Patent
Agarwal et al.

(10) Patent No.: US 11,442,579 B2
(45) Date of Patent: Sep. 13, 2022

(54) METHOD AND ELECTRONIC DEVICE FOR ACCIDENTAL TOUCH PREDICTION USING ML CLASSIFICATION

(71) Applicant: Samsung Electronics Co., Ltd., Suwon-si (KR)

(72) Inventors: Ankit Agarwal, Noida (IN); Sunil Rathour, Noida (IN); Harshit Oberoi, Noida (IN); Nitesh Goyal, Noida (IN); Nitin Kishorbhai Tanwar, Noida (IN); Vipin Khushu, Noida (IN); Choice Choudhary, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 20 days.

(21) Appl. No.: 17/116,455

(22) Filed: Dec. 9, 2020

(65) Prior Publication Data

US 2021/0181919 A1    Jun. 17, 2021

(30) Foreign Application Priority Data

Dec. 13, 2019    (IN) .............................. 201941051867

(51) Int. Cl.
*G06F 3/041* (2006.01)
*G06N 20/00* (2019.01)
(Continued)

(52) U.S. Cl.
CPC .......... *G06F 3/04186* (2019.05); *G06F 17/18* (2013.01); *G06K 9/6267* (2013.01); *G06N 20/00* (2019.01)

(58) Field of Classification Search
CPC .... G06F 3/04186; G06F 17/18; G06F 3/0418; G06K 9/6267; G06N 20/00; G06N 5/003; G06N 20/20; G06N 3/0454; G06N 3/08
See application file for complete search history.

(56) References Cited

U.S. PATENT DOCUMENTS

| | | | |
|---|---|---|---|
| 11,140,256 B1 * | 10/2021 | DeMaio | H04M 1/72454 |
| 2008/0165116 A1 * | 7/2008 | Herz | G09G 3/3406 |
| | | | 345/98 |

(Continued)

FOREIGN PATENT DOCUMENTS

| | | |
|---|---|---|
| CN | 110209335 A | 9/2019 |
| EP | 3 080 684 A1 | 10/2016 |

OTHER PUBLICATIONS

Extended European Search Report dated Apr. 30, 2021, issued in European Patent Application No. 20212896.3.

(Continued)

*Primary Examiner* — Ibrahim A Khan
(74) *Attorney, Agent, or Firm* — Jefferson IP Law, LLP

(57) ABSTRACT

A method for accidental touch prediction using machine learning (ML) classification is provided. The method includes determining, by an electronic device, a mutual data index of a sensor data using a first ML model. Further, the method includes recognizing whether the sensor data corresponds to an object touch or a non-object touch based on the mutual data index. Further, the method includes performing, by the electronic device, one of detecting that the electronic device is in a pocket mode and providing an object touch notification on a touch screen of the electronic device in response to determining that the sensor data corresponds to the object touch, and recognizing whether the sensor data corresponds to an accidental touch or a non-accidental touch using at least one second ML model based on touch data in response to determining that the sensor data corresponds to the non-object touch.

22 Claims, 26 Drawing Sheets

(51) Int. Cl.
G06F 17/18 (2006.01)
G06K 9/62 (2022.01)

(56) References Cited

U.S. PATENT DOCUMENTS

| | | | | |
|---|---|---|---|---|
| 2010/0317400 | A1* | 12/2010 | Bivens | H04M 1/724 |
| | | | | 706/26 |
| 2013/0050233 | A1* | 2/2013 | Hirsch | G09G 5/02 |
| | | | | 345/589 |
| 2014/0120891 | A1* | 5/2014 | Chen | G06F 3/0488 |
| | | | | 455/418 |
| 2015/0205412 | A1* | 7/2015 | Kim | G06F 3/04842 |
| | | | | 345/174 |
| 2016/0012348 | A1* | 1/2016 | Johnson | G06N 20/00 |
| | | | | 706/12 |
| 2016/0026219 | A1* | 1/2016 | Kim | G06F 1/1641 |
| | | | | 345/173 |
| 2016/0253651 | A1* | 9/2016 | Park | G06Q 20/34 |
| | | | | 705/39 |
| 2018/0181245 | A1* | 6/2018 | Beck | G06F 3/04883 |
| 2018/0188938 | A1* | 7/2018 | Deselaers | G06N 20/00 |
| 2018/0314387 | A1* | 11/2018 | Hwang | G06N 7/005 |
| 2020/0064960 | A1* | 2/2020 | Munemoto | G06F 3/04883 |

OTHER PUBLICATIONS

Indian Examination Report dated Oct. 8, 2021, issued in Indian Application No. 201941051867.

* cited by examiner

| -13 | -14 | -22 | -17 | -20 | -18 | -20 | -21 | -20 | -23 | -21 | -14 | -11 | -15 | -11 |
|---|---|---|---|---|---|---|---|---|---|---|---|---|---|---|
| -6 | -17 | -20 | -18 | -25 | -18 | -19 | -19 | -18 | -26 | -19 | -13 | -13 | -11 | -15 |
| -12 | -14 | -23 | -17 | -20 | -19 | -17 | -18 | -19 | -25 | -17 | -12 | -11 | -15 | -10 |
| -5 | -17 | -17 | -16 | -22 | -18 | -18 | -18 | -16 | -24 | -24 | -9 | -13 | -12 | -11 |
| -8 | -18 | -20 | -18 | -20 | -20 | -20 | -19 | -19 | -26 | -22 | -24 | -13 | -10 | -12 |
| -7 | -18 | -20 | -14 | -20 | -18 | -15 | -16 | -16 | -25 | -19 | -14 | -13 | -15 | -7 |
| -24 | -18 | -26 | -18 | -21 | -19 | -19 | -22 | -22 | -27 | -20 | -13 | -14 | -18 | -15 |
| -28 | -30 | -32 | -29 | -31 | -27 | -25 | -24 | -29 | -38 | -33 | -24 | -24 | -24 | -22 |
| -21 | -39 | -44 | -39 | -33 | -11 | -7 | -21 | -38 | -50 | -39 | -33 | -34 | -34 | -34 |
| -17 | -32 | -34 | -23 | -40 | 65 | 59 | 63 | -9 | -33 | -34 | -26 | -23 | -26 | -22 |
| -17 | -29 | -24 | -43 | -51 | 43 | 38 | 50 | 64 | -22 | -25 | -19 | -27 | -25 | -19 |
| -14 | -23 | -14 | 71 | 49 | 47 | 40 | 57 | 74 | -3 | -25 | -19 | -27 | -22 | -13 |
| -24 | -23 | -14 | 70 | 51 | 46 | 42 | 52 | 79 | -8 | -22 | -14 | -17 | -20 | -17 |
| -27 | -29 | -27 | 20 | 51 | 49 | 44 | 56 | 32 | 30 | -33 | -25 | -26 | -25 | -22 |
| -25 | -33 | -37 | 43 | 4 | 49 | 47 | 17 | -39 | -40 | -34 | -29 | -26 | -28 | -28 |
| 0 | -36 | -41 | -33 | -36 | -24 | -29 | -31 | -32 | -39 | -39 | -29 | -29 | -30 | -32 |

METHOD AND ELECTRONIC DEVICE FOR ACCIDENTAL TOUCH PREDICTION USING ML CLASSIFICATION

CROSS-REFERENCE TO RELATED APPLICATION(S)

This application is based on and claims priority under 35 U.S.C. § 119(a) of an Indian patent application number 201941051867, filed on Dec. 13, 2019, in the Indian Intellectual Property Office, the disclosure of which is incorporated by reference herein in its entirety.

BACKGROUND

1. Field

The disclosure relates to a touch predication system. More particularly, the disclosure relates to a method and electronic device for accidental touch prediction using machine learning (ML) classification.

2. Description of Related Art

In general, an electronic device supports an accidental touch feature (e.g., pocket mode or the like) using a sensor device (e.g., proximity sensor, light sensor or the like). In an example, the electronic device detects light sensor value and proximity sensor value. If the light sensor value is less than 5 lux and the proximity sensor value is equal to zero then, the electronic device shows an accidental touch pop-up on a display.

Many methods and systems have been proposed for accidental touch prediction in the electronic device, but these methods and systems may have disadvantages in terms of cost, size, circuit arrangement design, power consumption, reliability, integrity issues, operation dependency, time, complexity, hardware components used, and so on.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for accidental touch prediction using machine learning (ML) classification without requiring the proximity sensor.

Another aspect of the disclosure is to capture a sensor data corresponding to a touch on a touch screen of an electronic device.

Another aspect of the disclosure is to determine an accidental touch using a mutual data index of the sensor data based ML.

Another aspect of the disclosure is to recognize whether the sensor data corresponds to an object touch or a non-object touch based on the mutual data index.

Another aspect of the disclosure is to detect that the electronic device is in a pocket mode and provide an object touch notification when the sensor data corresponds to the object touch.

Another aspect of the disclosure is to recognize whether the sensor data corresponds to an accidental touch or a non-accidental touch using a device feature based ML model or ensemble based ML model when the sensor data corresponds to the non-object touch.

Additional aspects will be set forth in part in the description which follows and, in part, will be apparent from the description, or may be learned by practice of the presented embodiments.

In accordance with an aspect of the disclosure, a method for accidental touch prediction using machine learning (ML) classification by an electronic device is provided. The method includes capturing, by the electronic device, a sensor data corresponding to a touch on a touch screen of the electronic device. Further, the method includes determining, by the electronic device, an accidental touch using a mutual data index of the sensor data using a first ML model. Further, the method includes recognizing, by the electronic device, whether the sensor data corresponds to an object touch or a non-object touch based on the mutual data index. Further, the method includes performing, by the electronic device, one of detecting that the electronic device is in a pocket mode and providing an object touch notification in response to determining that the sensor data corresponds to the object touch, and recognizing whether the sensor data corresponds to an accidental touch or a non-accidental touch using at least one second ML model in response to determining that the sensor data corresponds to the non-object touch.

In an embodiment, recognizing, by the electronic device, whether the sensor data corresponds to the object touch or the non-object touch based on the mutual data index includes extracting a relationship among mutual data indices, determining a probability information based on the extracted relationship, determining whether the probability information exceeds a probability criteria, and performing one of recognizing the sensor data corresponds to the object touch in response to determining that the probability information does not exceed the probability criteria, and recognizing the sensor data corresponds to the non-object touch in response to determining that the probability information exceeds the probability criteria.

In an embodiment, recognizing, by the electronic device, whether the sensor data corresponds to the accidental touch or the non-accidental touch using the at least one second ML model includes classifying the sensor data by running the at least one second ML model using one or more electronic device features with the mutual data index, determining whether the sensor data corresponds to the accidental touch or non-accidental touch using the at least one second ML model based on the classification, detecting that the electronic device is in the non-pocket mode in response to determining that the sensor data corresponds the accidental touch, and determining a luminance information of the electronic device, and detecting whether the electronic device is in the pocket mode or non-pocket mode based on the luminance information of the electronic device in response to determining that the sensor data corresponds to the accidental touch.

In an embodiment, detecting whether the electronic device is in the pocket mode or the non-pocket mode based on the luminance information of the electronic device includes determining whether the luminance information meets a luminance criteria, and performing one of detecting that the electronic device is in the non-pocket mode in response to the luminance information meets the luminance criteria, or detecting that the electronic device is in the pocket mode and providing the accidental touch notification in response to the luminance information does not meet the luminance criteria.

In an embodiment, recognizing, by the electronic device, whether the sensor data corresponds to the accidental touch or the non-accidental touch using the at least one second ML model includes classifying the sensor data by executing the at least one second ML model, wherein the second ML model comprises at least one a random forest neural network, an extreme gradient boosting tree neural network, a gradient boosting tree neural network, and a support vector machine neural network, determining whether the sensor data corresponds to the accidental touch or the non-accidental touch using the at least one second ML model based on the classification, detecting that the electronic device is in the pocket mode in response to determining that the sensor data corresponds the accidental touch, and determining a probability information associated with the at least one second ML model, and detecting whether the electronic device is in the pocket mode or the non-pocket mode based on the probability information in response to determining that the sensor data corresponds to the accidental touch, wherein the probability information is obtained based on a weightage factor comprising at least one of a training error value associated with the at least one second ML model, a mean runtime value of validation set associated with the at least one second ML model, and an update time of a model parameter associated with the at least one second ML model.

In an embodiment, detecting whether the electronic device is in the pocket mode or the non-pocket mode based on the probability information includes determining whether the probability information meets a probability criteria, and performing one of detecting that the electronic device is in the non-pocket mode in response to the probability information meets the probability criteria, and detecting that the electronic device is in the pocket mode and providing the accidental touch notification in response to the probability information does not meet the probability criteria, In an embodiment, the mutual data index indicates a resistance of a conductive object or a finger of the user that comes in contact with the touch screen of the electronic device.

In an embodiment, the first ML model is created and trained by obtaining a plurality of mutual data indexes from a plurality of users and objects, wherein each of the mutual data index indicates the sensor data corresponding to the electronic devices of the user, extracting local special features from the mutual data index of each of the user using a kernel operation, wherein the local special features is extracted based on a resistivity of a finger or an object that comes in contact with the touch screen of the electronic device, generating a heat map and a probability of abnormal touch based on the local special features, and creating and training the first ML mode using the heat map and the probability of abnormal touch. n*n size kernel/filters are used to extract local special features from the mutual data indices.

In an embodiment, the at least one second ML model is created and trained by receiving a plurality of feature dataset, determining an optimal feature that changes an impurity of each column and each value in respective column of electrodes associated with each of the feature dataset, generating at least one rule to split the feature dataset based on a maximum depth associated with the optimal feature, generating a plurality of classifiers based on at least one rule, and creating and training the at least one second ML based on the plurality of classifiers.

In an embodiment, the at least one second ML model is created and trained by obtaining a plurality of predefined accidental touch data and a plurality of predefined non-accidental touch data, obtaining a plurality of predefined electronic device features for the plurality of predefined accidental touch data and the plurality of predefined non-accidental touch data, building at least one classifier for the plurality of predefined electronic device features, simultaneously training at least one classifier for the plurality of predefined electronic device features, and creating and training the at least one second ML model based on the at least one trained classifier.

In an embodiment, the method further includes determining damage on the touch screen of the electronic device based on the object touch, and sharing information related to damage with a connected device in response to determining that the sensor data corresponds to the object touch.

In accordance with another aspect of the disclosure, an electronic device for accidental touch prediction using ML classification is provided. The electronic device includes a touch prediction engine coupled with a memory and a processor. The touch prediction engine is configured to capture a sensor data corresponding to a touch on a touch screen of the electronic device. Further, the touch prediction engine is configured to determine a mutual data index of the sensor data using a first ML model. The touch prediction engine is configured to recognize whether the sensor data corresponds to an object touch or a non-object touch based on the mutual data index. Further, the touch prediction engine is configured to perform one of detect that the electronic device is in a pocket mode and provide an object touch notification in response to determining that the sensor data corresponds to the object touch, or recognize whether the sensor data corresponds to an accidental touch or a non-accidental touch using at least one second ML model in response to determining that the sensor data corresponds to the non-object touch.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
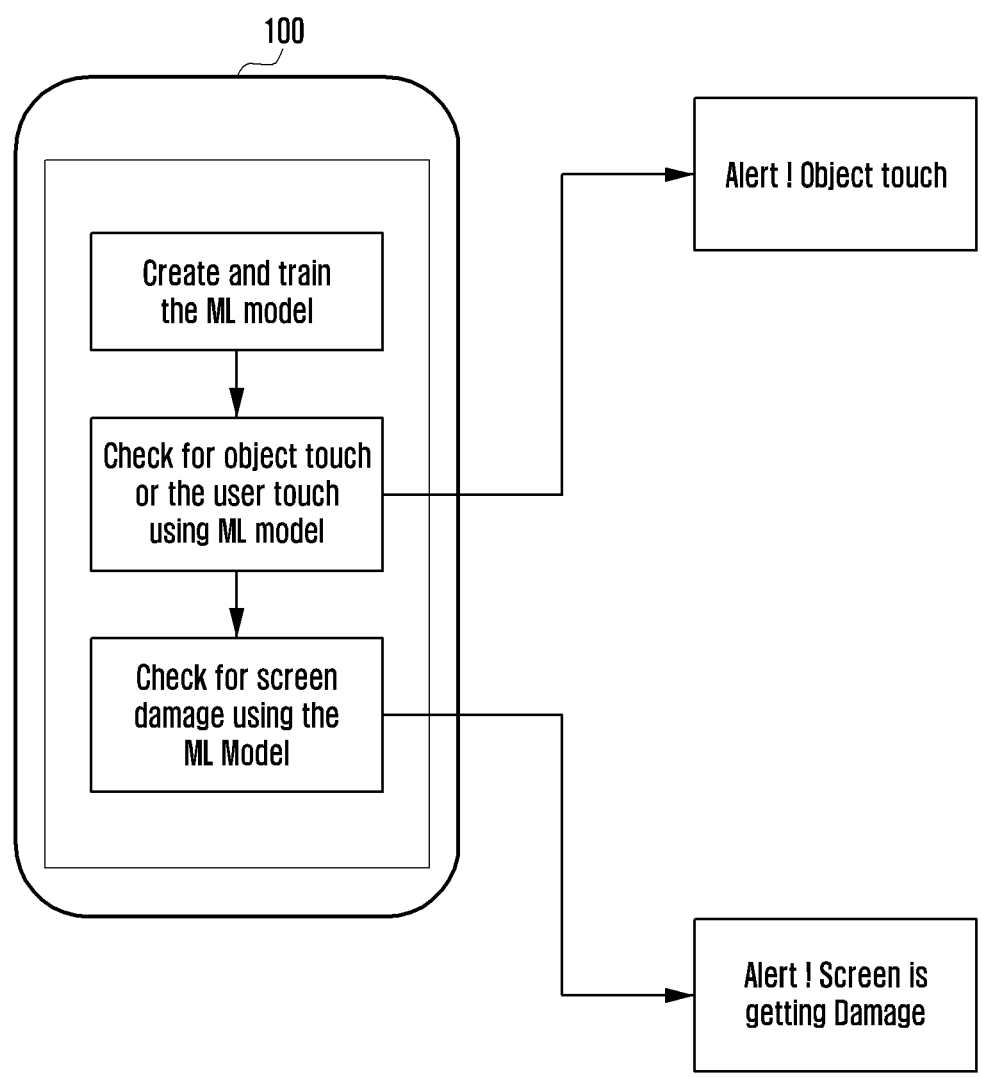
FIG. 1 illustrates various hardware components of an electronic device for accidental touch prediction using machine learning (ML) classification, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope. Likewise, the blocks of the embodiments may be physically combined into more complex blocks without departing from the scope.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly embodiments herein achieve an electronic device for accidental touch prediction using machine learning (ML) classification. The electronic device includes a touch prediction engine coupled with a memory and a processor. The touch prediction engine is configured to capture a sensor data corresponding to a touch on a touch screen of the electronic device. Further, the touch prediction engine is configured to determine a mutual data index of the sensor data using a first ML model. The touch prediction engine is configured to recognize whether the sensor data corresponds to an object touch or a non-object touch based on the mutual data index. Further, the touch prediction engine is configured to perform one of: detect that the electronic device is in a pocket mode and provide an object touch notification on the touch screen of the electronic device in response to determining that the sensor data corresponds to the object touch, and recognize whether the sensor data corresponds to an accidental touch or a non-accidental touch using at least one second ML model in response to determining that the sensor data corresponds to the non-object touch.

Unlike conventional methods and systems, the method can be used to detect the accidental touch prediction using the ML classification without requiring existing hardware. This results in detecting the accidental touch prediction on the electronic device in a cost effective and accurate manner.

Referring now to the drawings, and more particularly to FIGS. 1 through 8, there are shown preferred according to various embodiments of the disclosure.

FIG. 1 illustrates various hardware components of an electronic device 100 for accidental touch prediction using ML classification, according to an embodiment of the disclosure. The electronic device 100 can be, for example, but not limited to a smart phone, a Personal Digital Assistant (PDA), a tablet computer, a laptop computer, a smart watch, a smart band, a virtual reality device, an immersive device, a foldable device, an Internet of Things (IoT), or the like.

Referring to FIG. 1, the electronic device 100 is configured to capture a sensor data corresponding to a touch on a touch screen. Further, the electronic device 100 is configured to determine a mutual data index of the sensor data using a first ML model (e.g., mutual data index based ML model). In an embodiment, the mutual data index indicates a resistance of a conductive object or a finger of a user that comes in contact with the touch screen of the electronic device 100, as indicated in the FIG. 6A. In an example, resistance of finger is 800 ohms-1600 ohms, resistance of a metal is $10^{-5}$ ohms-$10^{-4}$ ohms, and resistance of the water is $10^{3}$-$10^{4}$ ohms. Based on the mutual data index, the electronic device 100 is configured to recognize whether the sensor data corresponds to an object touch or a non-object touch. In an example, the an object touch (e.g., bottle touch with touch screen of the electronic device 100, key touch with touch screen of the electronic device 100, coin touch with touch screen of the electronic device 100, pen touch with touch screen of the electronic device 100 or the like) are illustrated in the FIGS. 3A to 3E. In an example, non-object touch (i.e., human touch) (e.g., swipe single finger on the touch screen, image zoom touch on the touch screen, zoom in out or the like) are depicted in the FIGS. 2A to 2C.

Figure 2A:
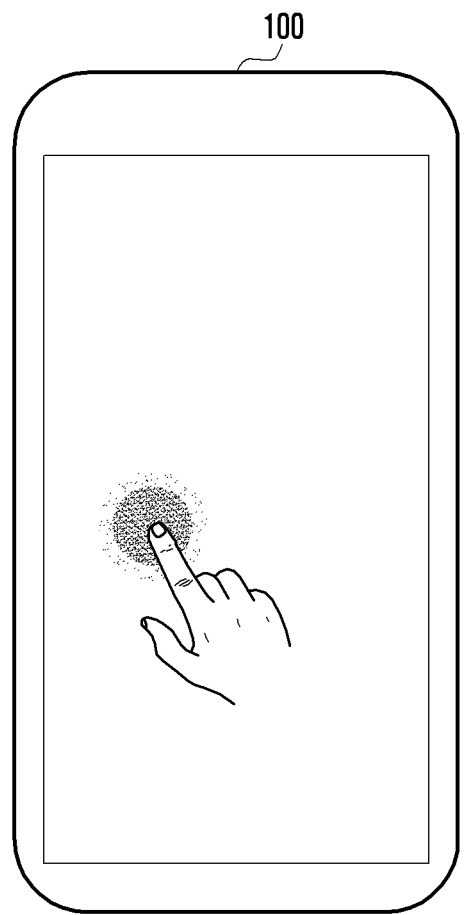
FIGS. 2A, 2B and 2C are example illustrations in which an object touch is depicted, according to various embodiments of the disclosure.
Figure 2B:
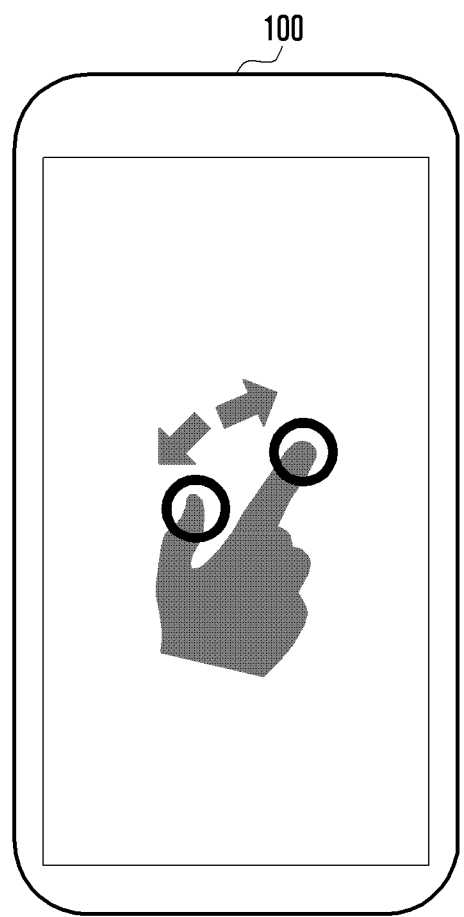
Figure 2C:
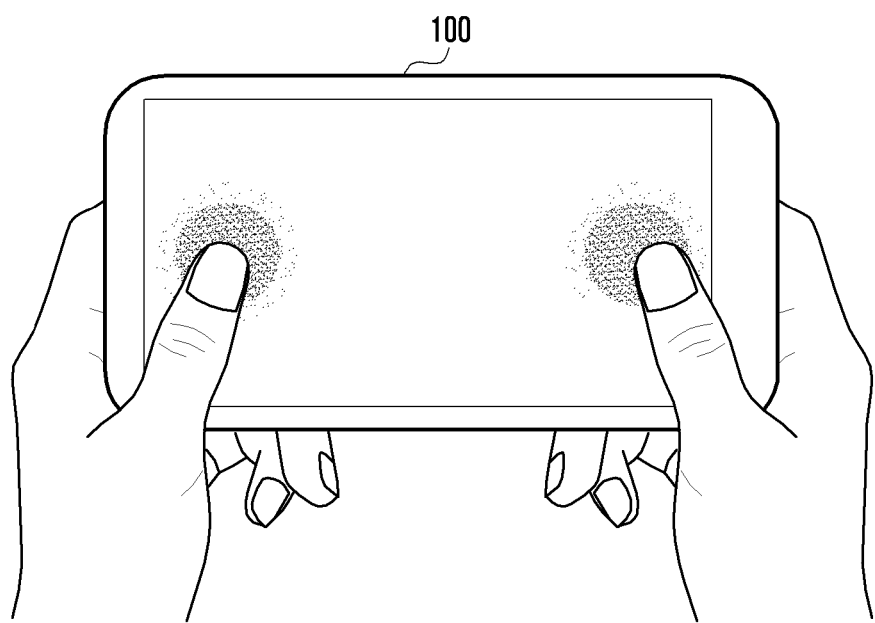
Figure 3A:
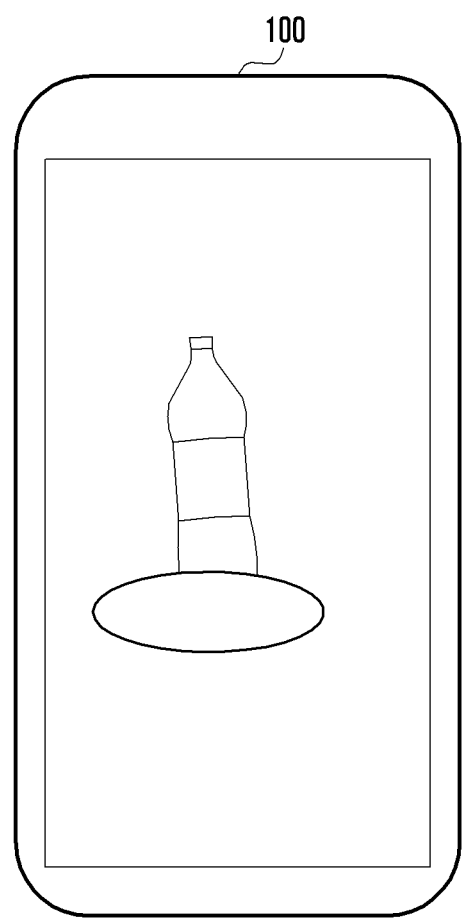
FIGS. 3A, 3B, 3C, 3D and 3E are example illustrations in which a non-object touch is depicted, according to various embodiments of the disclosure.
Figure 3B:
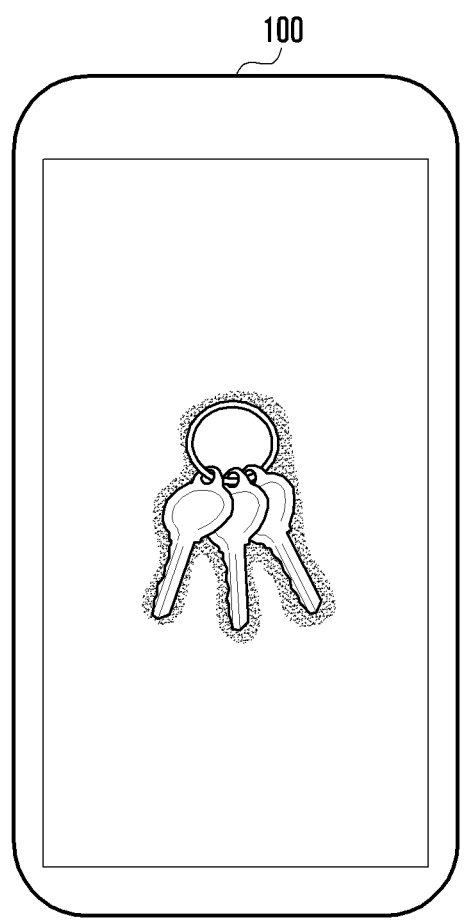
Figure 3C:
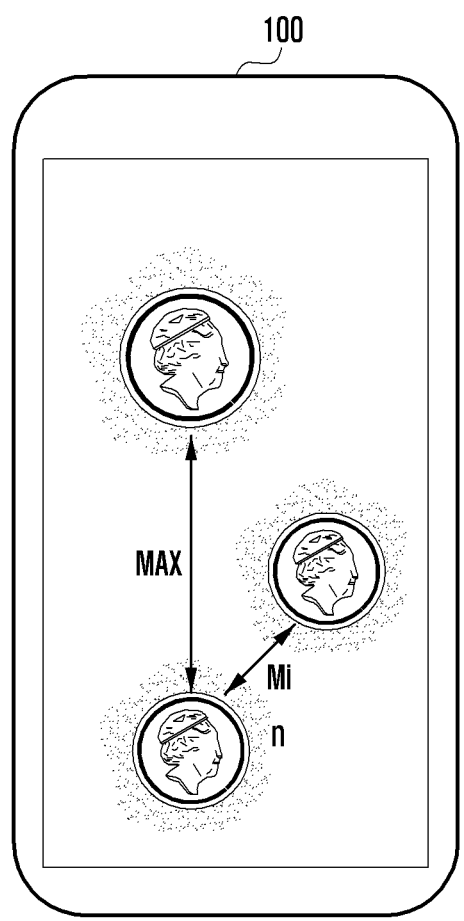
Figure 3D:
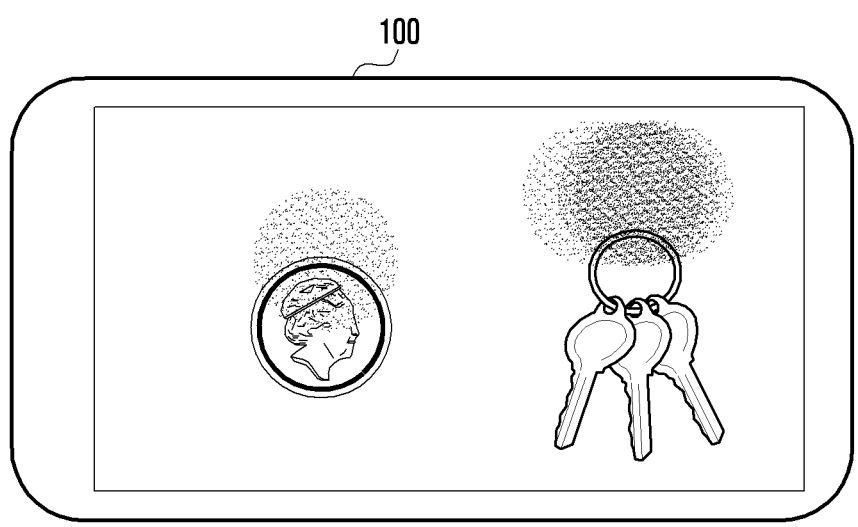
Figure 3E:
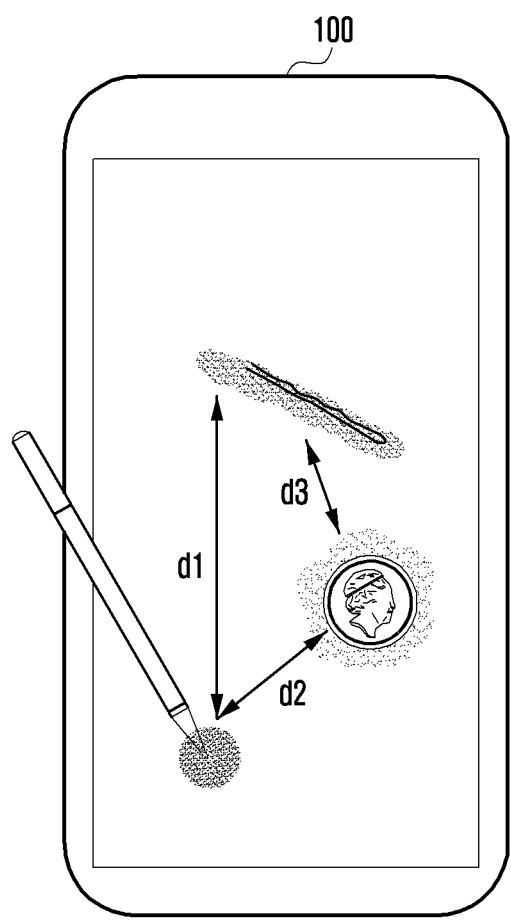

FIGS. 2A, 2B and 2C are example illustrations in which an object touch is depicted, according to various embodiments of the disclosure.

Referring to FIGS. 2A to 2C, in order to detect the object touch or the non-object touch, the electronic device 100 is configured to extract a relationship among mutual data indices. n*n size kernel/filters are used to extract local special features from the mutual data indices. Further, the electronic device 100 is configured to determine a probability information based on the extracted relationship. Further, the electronic device 100 is configured to determine whether the probability information exceeds the probability criteria. Further, the electronic device 100 is configured to recognize the sensor data corresponds to the object touch in response to determine that the probability information does not exceed the probability criteria, and recognize the sensor data corresponds to the non-object touch in response to determine that the probability information exceeds the probability criteria.

The probability information in the mutual data model is acquired after applying the local feature extraction and then using the device feature which provides the probability information that is compared with the threshold criteria to make final classification decision.

In an embodiment, when the sensor data corresponds to the object touch, the electronic device 100 is configured to detect that the electronic device 100 is in a pocket mode and provide an object touch notification. In an example, the object touch notification is displayed on the touch screen of the electronic device 100. In another example, the object touch notification is shared with another electronic device.

In another embodiment, when the sensor data corresponds to the non-object touch, the electronic device 100 recognizes whether the sensor data corresponds to an accidental touch or a non-accidental touch using at least one second ML model (e.g., device feature based ML model, ensemble based ML model or the like).

In an embodiment, in order to detect the accidental touch or the non-accidental touch, the electronic device 100 is configured to classify the sensor data by running the second ML model (i.e., device feature based ML model) using one or more electronic device features. The electronic device features are extracted from touch data sets. The electronic device feature can be, for example, but not limited to an action type, a touch count, touch coordinates, touch sizes, touch pressure, total touch area, a mean touch area, a standard deviation touch area, size difference of the touch area, maximum distance between touch points, a minimum distance between touch points, mean distance between touch points, a standard deviation distance between touch points, time difference between consecutive touches or the like.

Based on the classification, the electronic device 100 is configured to determine whether the sensor data corresponds to the accidental touch or non-accidental touch using the at least one second ML model. If the sensor data corresponds the accidental touch, the electronic device 100 is configured to detect that the electronic device 100 is in the non-pocket mode. If the sensor data corresponds to the accidental touch, the electronic device 100 is configured to determine a luminance information of the electronic device 100 and detect whether the electronic device 100 is in the pocket mode or the non-pocket mode based on the luminance information of the electronic device 100. By using the device feature based ML model, the electronic device 100 is configured to recognize whether the sensor data corresponds to the accidental touch or the non-accidental touch.

In an embodiment, the electronic device is configured to determine whether the luminance information meets a luminance criteria. If the luminance information meets the luminance criteria then, the electronic device (100) detects that the electronic device (100) is in the non-pocket mode. If the luminance information does not meet the luminance criteria then, the electronic device (100) is configured to detect that the electronic device (100) is in the pocket mode and provide the accidental touch notification on the touch screen.

In an embodiment, the electronic device (100) is configured to classify the sensor data by executing the second ML model (i.e., ensemble based ML model). The ensemble based ML model includes at least one a random forest neural network, an extreme gradient boosting tree neural network, a gradient boosting tree neural network, and a support vector machine neural network. Based on the classification, the electronic device 100 is configured to determine whether the sensor data corresponds to the accidental touch or the non-accidental touch using the ensemble based ML model. If the sensor data corresponds the accidental touch then, the electronic device detects that the electronic device 100 is in the pocket mode. If the sensor data corresponds to the accidental touch then, the electronic device 100 is configured to determine a probability information associated with the ensemble based ML model, and detect whether the electronic device 100 is in the pocket mode or the non-pocket mode based on the probability information. The probability information is obtained based on a weightage factor comprising at least one of a training error value associated with the ensemble based ML model, a mean runtime value of validation set associated with the ensemble based ML model, and an update time of a model parameter associated with the ensemble based ML model. By using the ensemble based ML model, the electronic device 100 recognizes that the sensor data corresponds to the accidental touch or the non-accidental touch.

For the ensemble based ML model, the electronic device 100 calculates a weight factor for each model output which is multiplied to get final probability output. This probability will be used to predict normal touch and abnormal touch. The weight factors are learned over the period of time by experimentation.

In an embodiment, the electronic device 100 is configured to determine whether the probability information meets a probability criteria. If the probability information meets the probability criteria then, the electronic device 100 detects that the electronic device 100 is in the non-pocket mode. If the probability information does not meet the probability criteria then, the electronic device 100 detects that the electronic device 100 is in the pocket mode and provide the accidental touch notification on the touch screen.

In an embodiment, the electronic device 100 determines damage on the touch screen based on the object touch, and share information related to damage with a connected device in response to determining that the sensor data corresponds to the object touch. The information may include the object related information or the finger touch related information along with level of damage. In an embodiment, the electronic device 100 indicates the damage information, in the form of vibration or an alert, to the user.

Although the FIG. 1 shows overview of the electronic device 100 but it is to be understood that other embodiments are not limited thereon. In other embodiments, the electronic device 100 may include less or more number of components. Further, the labels or names of the components are used only for illustrative purpose and does not limit the scope.

FIGS. 3A, 3B, 3C, 3D and 3E are example illustrations in which a non-object touch is depicted, according to various embodiments of the disclosure.

Figure 4:
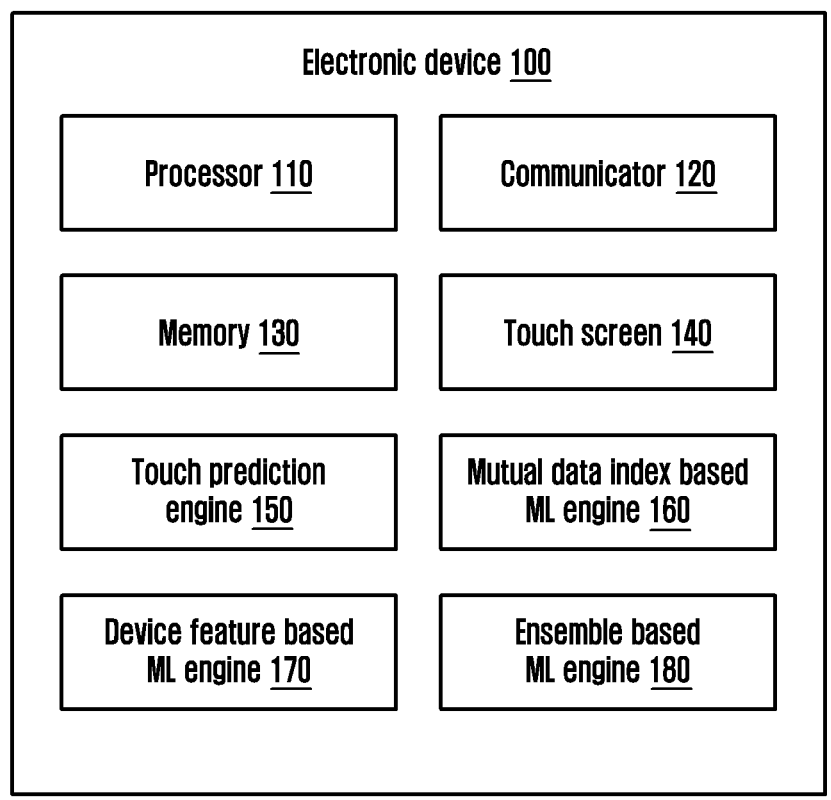
FIG. 4 illustrates various hardware components of the electronic device for accidental touch prediction using the ML classification, according to an embodiment of the disclosure.

FIG. 4 illustrates various hardware components of an electronic device for accidental touch prediction using the ML classification, according to an embodiment of the disclosure.

Referring to FIG. 4, the electronic device 100 includes a processor 110, a communicator 120, a memory 130, a touch screen 140, a touch prediction engine 150, a mutual data index based ML engine 160, a device feature based ML engine 170, and an ensemble based ML engine 180. The processor 110 is provided with the communicator 120, the memory 130, the touch screen 140, the touch prediction engine 150, the mutual data index based ML engine 160, the device feature based ML engine 170, and the ensemble based ML engine 180.

In an embodiment, the touch prediction engine 150 is configured to capture the sensor data corresponding to the touch on the touch screen 140. After capturing the sensor data, the touch prediction engine 150 is configured to determine the mutual data index of the sensor data using the mutual data index based ML engine 160. Further, the touch prediction engine 150 is configured to recognize whether the sensor data corresponds to the object touch or the non-object touch based on the mutual data index.

In an embodiment, in order to detect the object touch or the non-object touch, the touch prediction engine 150 is configured to extract the relationship among mutual data indices. Further, the touch prediction engine 150 is configured to determine the probability information based on the extracted relationship. Further, the touch prediction engine 150 is configured to determine whether the probability information exceeds the probability criteria. Further, the touch prediction engine 150 is configured to recognize the sensor data corresponds to the object touch in response to determine that the probability information does not exceed the probability criteria, and recognize the sensor data corresponds to the non-object touch in response to determine that the probability information exceeds the probability criteria.

In an embodiment, when the sensor data corresponds to the object touch, the touch prediction engine 150 is configured to detect that the electronic device 100 is in the pocket mode and provide the object touch notification. In another embodiment, in response to determining that the sensor data corresponds to the non-object touch, the touch prediction engine 150 recognizes whether the sensor data corresponds to the accidental touch or the non-accidental touch using one of the device feature based ML engine 170 and the ensemble based ML engine 180.

In an embodiment, the touch prediction engine 150 is configured to classify the sensor data by running the device feature based ML model using one or more electronic device features with the mutual data index by the device feature based ML engine 170. Based on the classification, the touch prediction engine 150 is configured to determine whether the sensor data corresponds to the accidental touch or the non-accidental touch using the device feature based ML model. If the sensor data corresponds the accidental touch, the touch prediction engine 150 is configured to detect that the electronic device 100 is in the non-pocket mode. If the sensor data corresponds to the accidental touch, the touch prediction engine 150 is configured to determine the luminance information of the electronic device 100 and detect whether the electronic device 100 is in the pocket mode or the non-pocket mode based on the luminance information of the electronic device 100.

By using the device feature based ML model, the touch prediction engine 150 is configured to recognize whether the sensor data corresponds to the accidental touch or the non-accidental touch.

In an embodiment, the touch prediction engine 150 is configured to determine whether the luminance information meets the luminance criteria. If the luminance information meets the luminance criteria then, the touch prediction engine 150 detects that the electronic device 100 is in the non-pocket mode. If the luminance information does not meet the luminance criteria then, the touch prediction engine 150 is configured to detect that the electronic device 100 is in the pocket mode and provide the accidental touch notification on the touch screen 140.

In an embodiment, the touch prediction engine 150 is configured to classify the sensor data by executing the ensemble based ML model using the ensemble based ML engine 180. Based on the classification, the touch prediction engine 150 is configured to determine whether the sensor data corresponds to the accidental touch or the non-accidental touch using the ensemble based ML model. If the sensor data corresponds the accidental touch then, the touch prediction engine 150 detects that the electronic device 100 is in the pocket mode. If the sensor data corresponds to the accidental touch then, the touch prediction engine 150 is configured to determine the probability information associated with the ensemble based ML model, and detect whether the electronic device 100 is in the pocket mode or the non-pocket mode based on the probability information. By using the ensemble based ML model, the touch prediction engine 150 recognizes that the sensor data corresponds to the accidental touch or the non-accidental touch.

In an embodiment, the touch prediction engine 150 is configured to determine whether the probability information meets the probability criteria. For the ensemble based ML model, the touch prediction engine 150 computes the weight factor for each model output which is multiplied to get final probability output. This probability will be used to predict normal touch and abnormal touch. The weight factors are learned over the period of time by experimentation.

If the probability information meets the probability criteria then, the touch prediction engine 150 detects that the electronic device 100 is in the non-pocket mode. If the probability information does not meet the probability criteria then, the touch prediction engine 150 detects that the electronic device 100 is in the pocket mode and provide the accidental touch notification on the touch screen 140.

In an embodiment, the touch prediction engine 150 determines damage on the touch screen 140 based on the object touch, and share information related to damage with the connected device in response to determining that the sensor data corresponds to the object touch.

In an embodiment, the mutual data index based ML engine 160 is configured to create and train the first ML model by obtaining a plurality of mutual data indexes from the plurality of users and objects, wherein each of the mutual data index indicates the sensor data corresponding to the electronic devices of the user, extracting local special features from the mutual data index of each of the user using the kernel operations, where the local special features is extracted based on the resistivity of the finger or the object that comes in contact with the touch screen 140 of the electronic device 100, generating a heat map and a probability of abnormal touch based on the local special features, and creating and training the first ML mode using the heat map and the probability of abnormal touch.

In an embodiment, the device feature based ML engine 170 is configured to create and train the device feature based ML model by receiving a plurality of feature dataset, determining an optimal feature that changes an impurity of each column and each value in respective column of electrodes associated with each of the feature dataset, generating at least one rule to split the feature dataset based on a maximum depth associated with the optimal feature, generating a plurality of classifiers based on at least one rule, and creating and training the device feature based ML model based on the plurality of classifiers.

In an embodiment, the ensemble based ML engine 180 is configured to create and train the ensemble based ML model by obtaining a plurality of predefined accidental touch data and a plurality of predefined non-accidental touch data, obtaining a plurality of predefined electronic device features for the plurality of predefined accidental touch data and the plurality of predefined non-accidental touch data, building at least one classifier for the plurality of predefined electronic device features, simultaneously training at least one classifier for the plurality of predefined electronic device features, and creating and training the ensemble based ML model based on the at least one trained classifier.

The processor 110 is configured to execute instructions stored in the memory 130 and to perform various processes. The communicator 120 is configured for communicating internally between internal hardware components and with external devices via one or more networks.

The memory 130 also stores instructions to be executed by the processor 110. The memory 130 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 130 may, in some examples, be considered a non-transitory storage medium. The term "non-transitory" may indicate that the storage medium is not embodied in a carrier wave or a propagated signal. However, the term "non-transitory" should not be interpreted that the memory 130 is non-movable. In some examples, the memory 130 can be configured to store larger amounts of information than the memory. In certain examples, a non-transitory storage medium may store data that can, over time, change (e.g., in Random Access Memory (RAM) or cache).

Although FIG. 4 shows various hardware components of the electronic device 100, it is to be understood that other embodiments are not limited thereon. In other embodiments, the electronic device 100 may include less or more number of components. Further, the labels or names of the components are used only for illustrative purpose and does not limit the scope. One or more components can be combined together to perform same or substantially similar function to detect the accidental touch prediction using the ML classification.

Figure 5A:
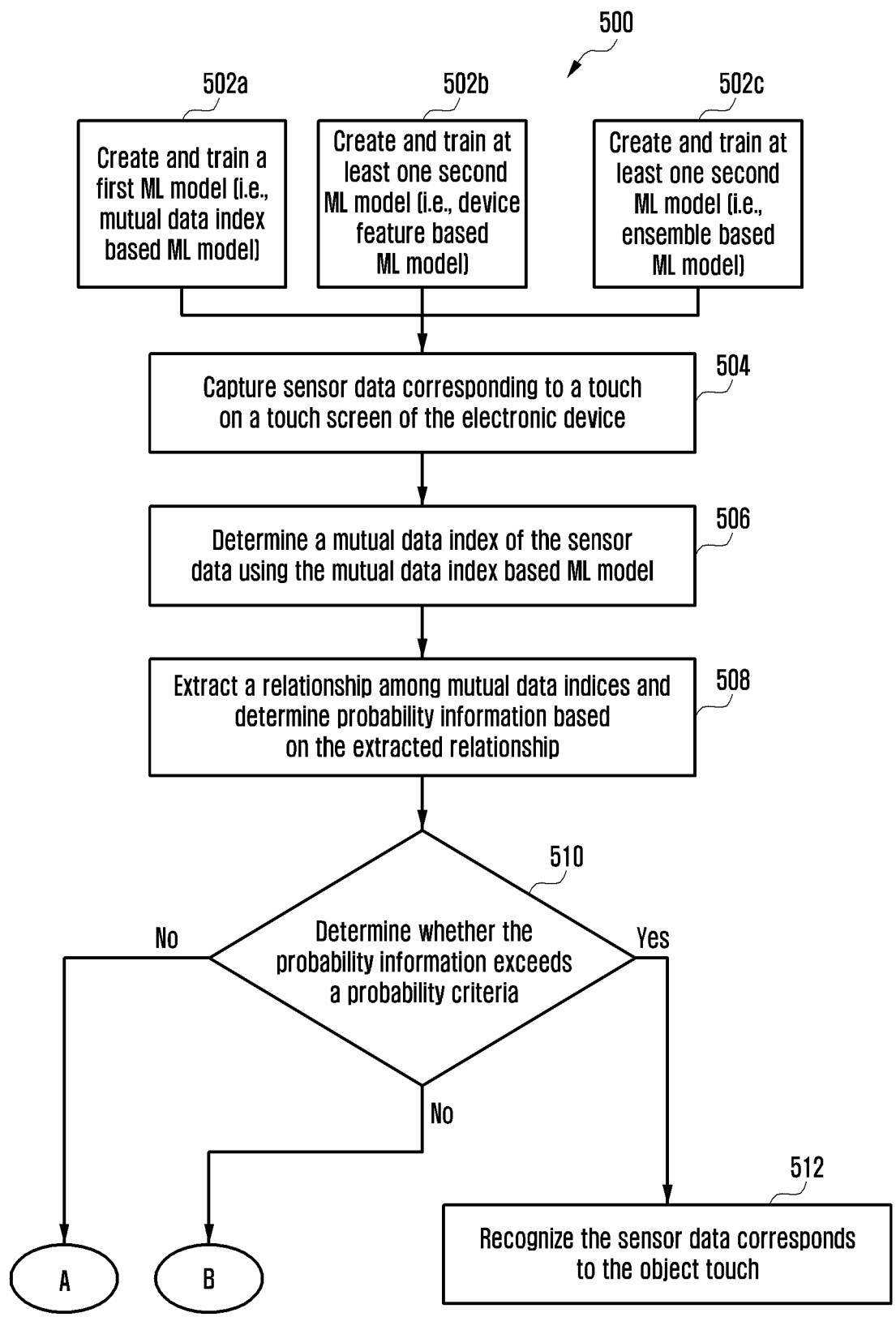
FIGS. 5AA, 5AB, and 5AC are flow charts illustrating a method for accidental touch prediction using the ML classification, according to various embodiments of the disclosure.
Figure 5A:
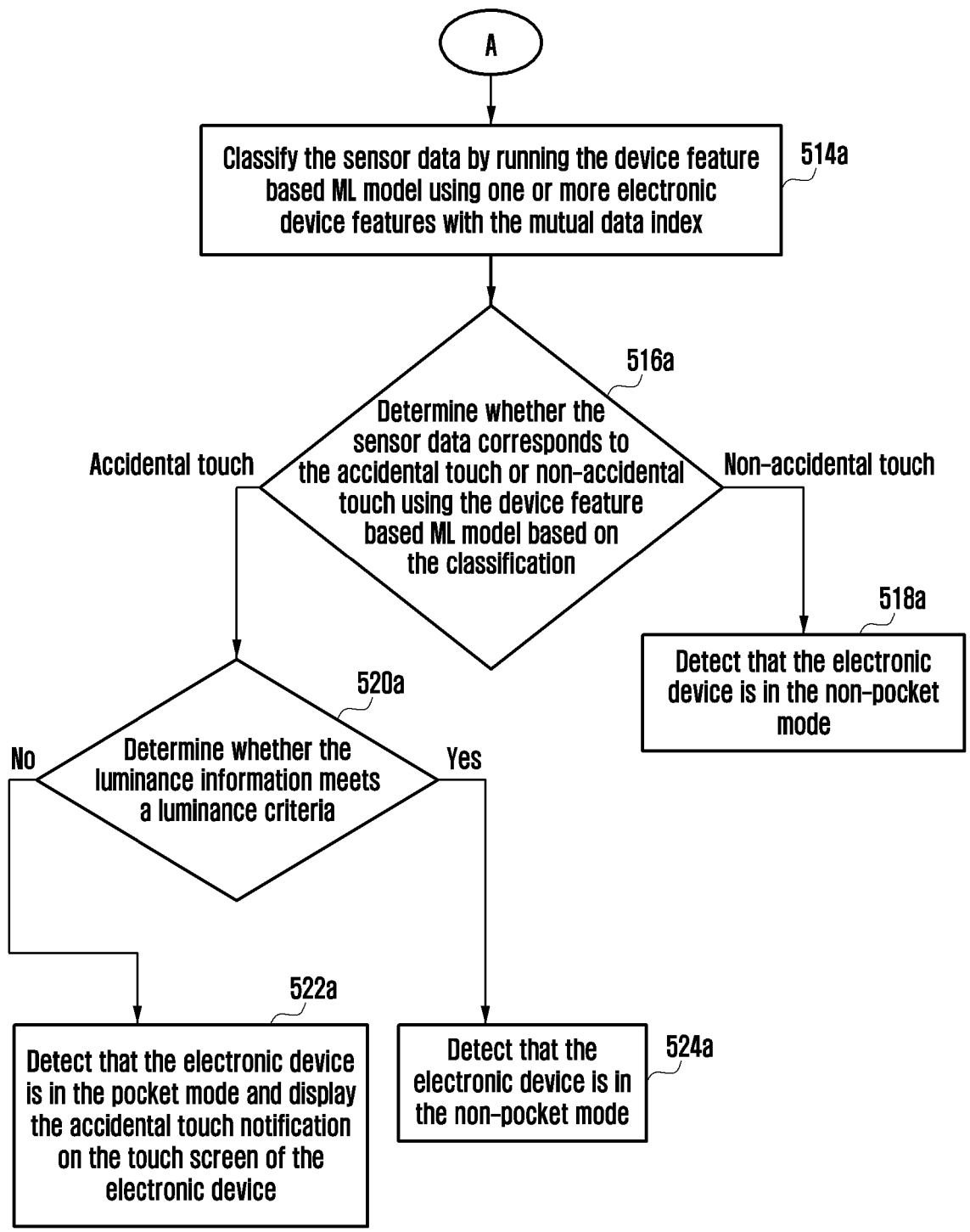
Figure 5A:
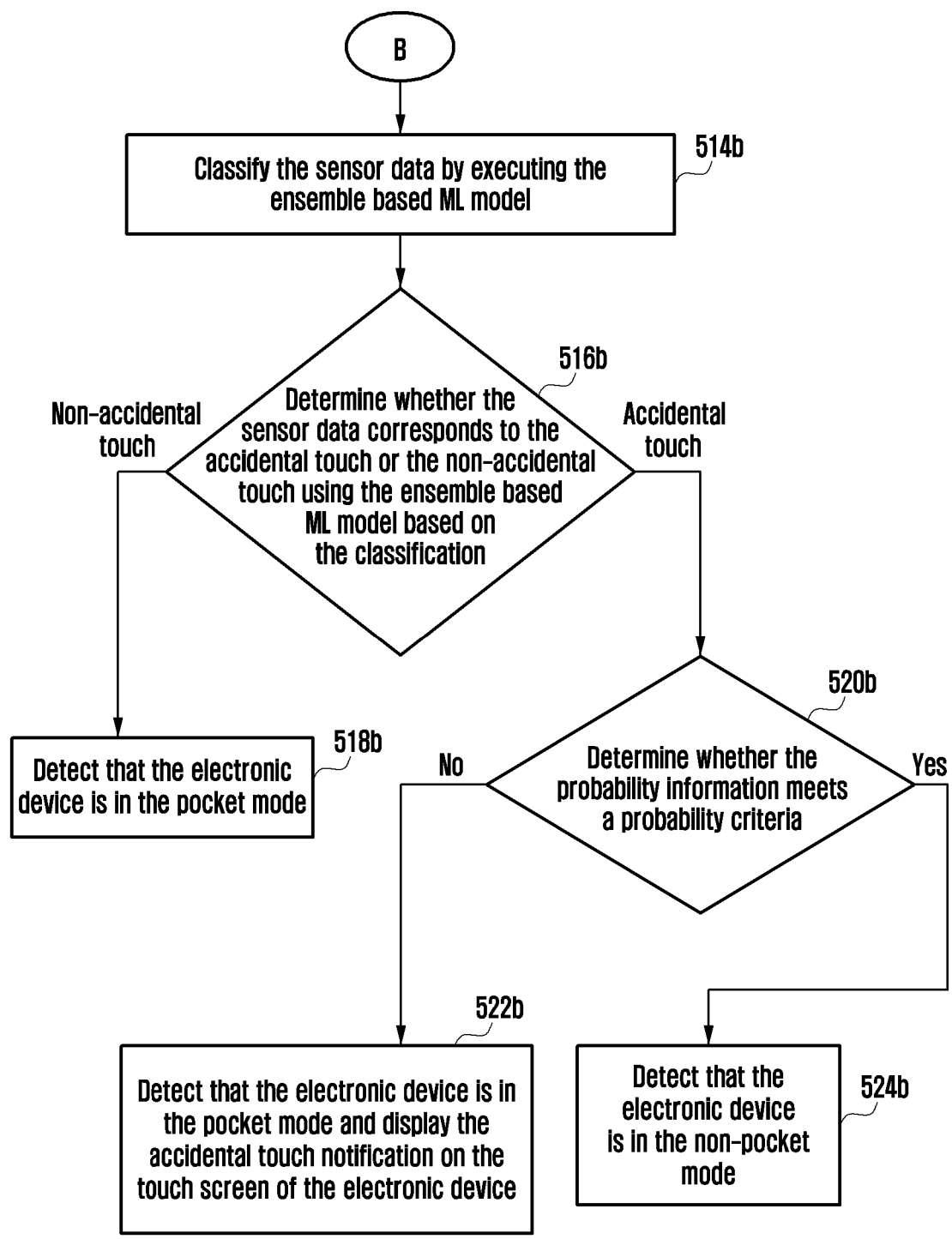

FIGS. 5AA to 5AC are flow charts illustrating a method for accidental touch prediction using the ML classification, according to various embodiments of the disclosure. Operations 502a-524b are performed by the touch prediction engine 150.

Figure 5B:
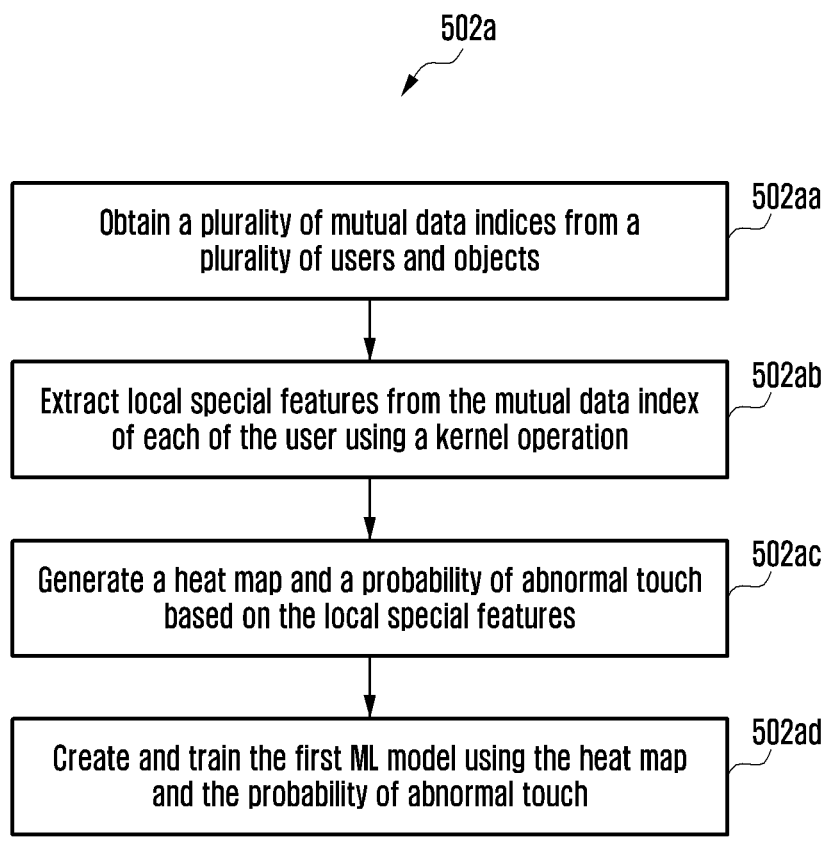
FIG. 5B is a flow chart illustrating various operations for creating and training a mutual data index based ML model, according to an embodiment of the disclosure.

FIG. 5B is a flow chart illustrating various operations for creating and training a mutual data index based ML model, according to an embodiment of the disclosure.

Figure 5C:
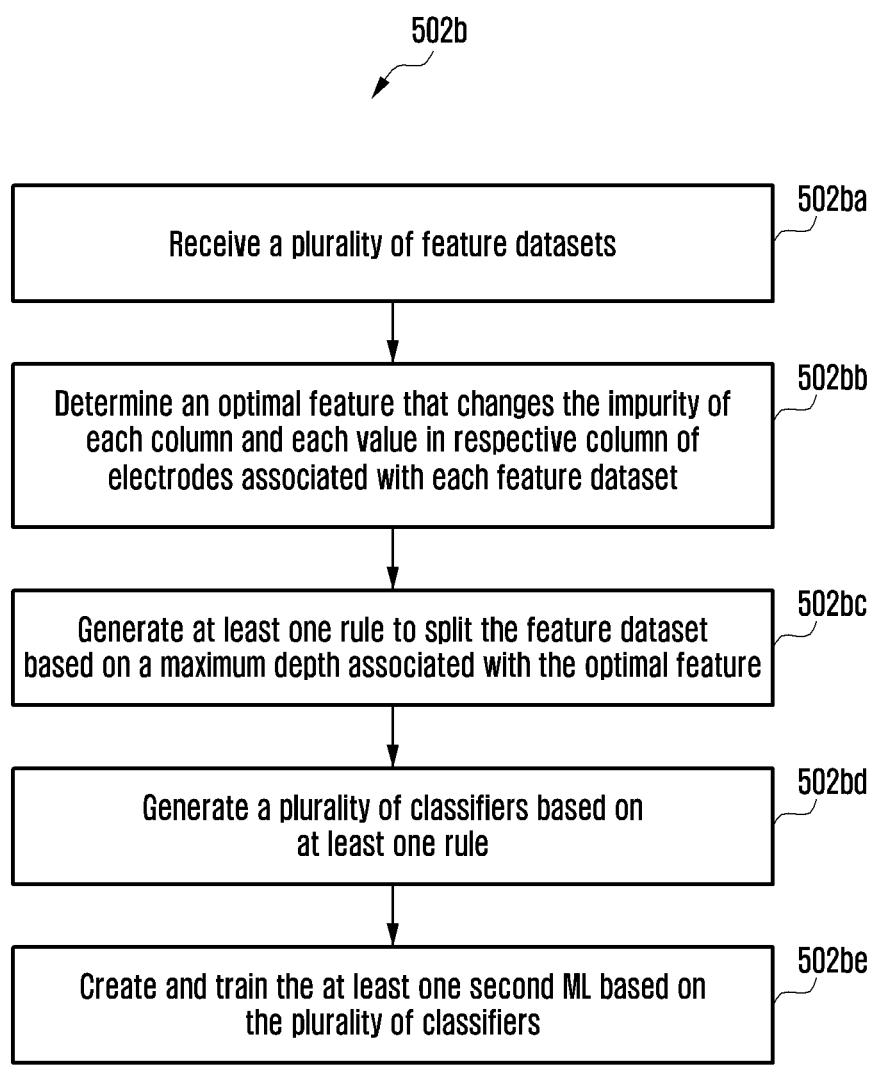
FIG. 5C is a flow chart illustrating various operations for creating and training the device feature based ML model, according to an embodiment of the disclosure.

FIG. 5C is a flow chart illustrating various operations for creating and training the device feature based ML model, according to an embodiment of the disclosure.

Figure 5D:
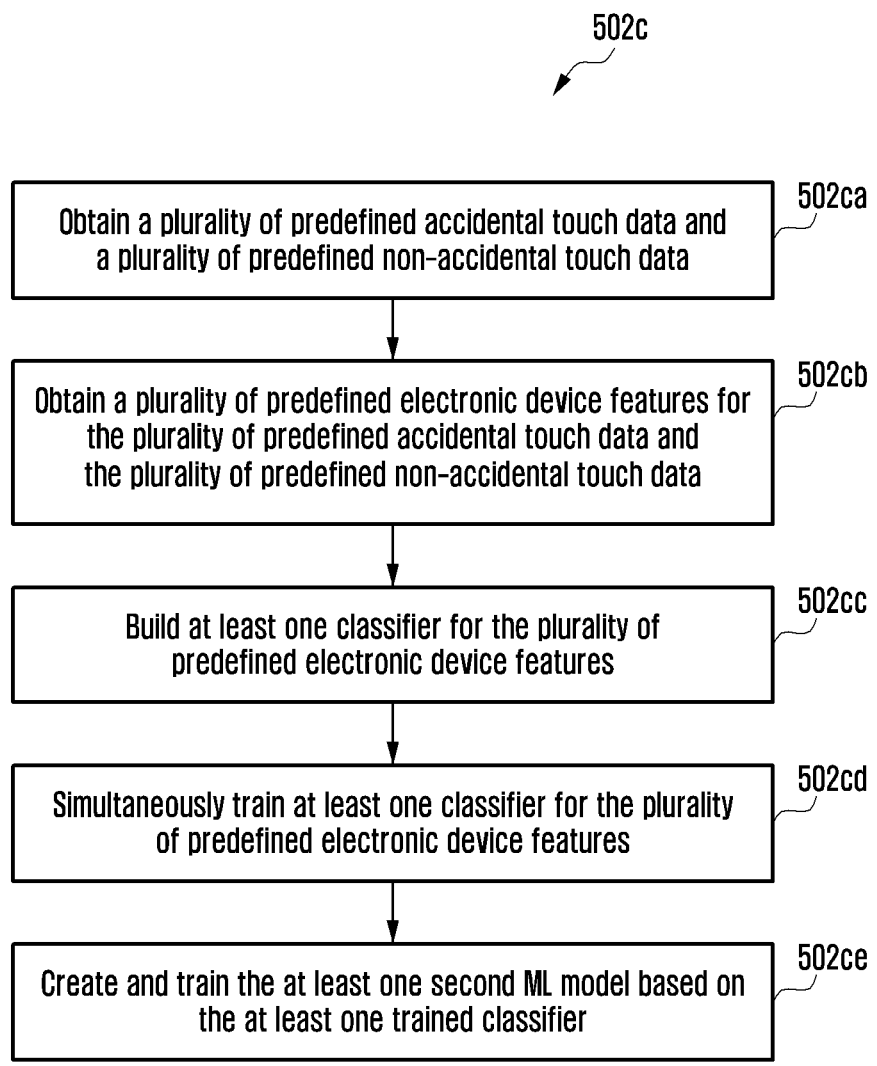
FIG. 5D is a flow chart illustrating various operations for creating and training the ensemble based ML model, according to an embodiment as disclosure.

FIG. 5D is a flow chart illustrating various operations for creating and training the ensemble based ML model, according to an embodiment as disclosure.

Referring to FIGS. 5AA to 5AC, at operation 502a, the method includes creating and training the mutual data index based ML model by using the mutual data index based ML engine 160. The creation and training of the mutual data index based ML model is explained in conjugation with FIG. 5B.

At operation 502b, the method includes creating and training the device feature based ML model by using the device feature based ML engine 170. The creation and training of the device feature based ML model is explained in conjugation with FIG. 5C.

At operation 502c, the method includes creating and training the ensemble based ML model using the ensemble based ML engine 180. The creation and training of the ensemble based ML model is explained in conjugation with FIG. 5D.

At operation 504, the method includes capturing the sensor data corresponding to the touch on the touch screen 140 of the electronic device 100. At operation 506, the method includes determining the mutual data index of the sensor data using the mutual data index based ML model. At operation 508, the method includes extracting the relationship among mutual data indices and determining the probability information based on the extracted relationship. At operation 510, the method includes determining whether the probability information meets the probability criteria.

If the probability information exceeds the probability criteria then, at operation 512, the method includes recognizing the sensor data corresponds to the object touch.

If the probability information does not exceed the probability criteria then, at operation 514a, the method includes classifying the sensor data by running the device feature based ML model using one or more electronic device features with the mutual data index.

At operation 516a, the method includes determining whether the sensor data corresponds to the accidental touch or the non-accidental touch using the device feature based ML model based on the classification. If the sensor data corresponds to the non-accidental touch then, at operation 518a, the method includes detecting that the electronic device 100 is in the non-pocket mode. If the sensor data corresponds to the accidental touch then, at operation 520a, the method includes determining whether the luminance information meets a luminance criteria.

If the luminance information meets the luminance criteria then, at operation 524a, the method includes detecting that the electronic device 100 is in the non-pocket mode. If the luminance information does not meet the luminance criteria then, at operation 522a, the method includes detecting that the electronic device 100 is in the pocket mode and displaying the accidental touch notification on the touch screen of the electronic device.

If the probability information does not exceed the probability criteria then, at operation 514b, the method includes classifying the sensor data by running the ensemble based ML model. At operation 516b, the method includes determining whether the sensor data corresponds to the accidental touch or the non-accidental touch using the ensemble based ML model based on the classification.

If the sensor data corresponds to the non-accidental touch then, at operation 518*b*, the method includes detecting that the electronic device 100 is in the pocket mode.

If the sensor data corresponds to the accidental touch then, at operation 520*b*, the method includes determining whether the probability information meets a probability criteria. If the probability information meets the probability criteria then, at operation 524*b*, the method includes detecting that the electronic device 100 is in the non-pocket mode. If the probability information does not meet the probability criteria then, at operation 522*b*, the method includes detecting that the electronic device 100 is in the pocket mode and displaying the accidental touch notification on the touch screen 140 of the electronic device 100.

The various actions, acts, blocks, steps, or the like in the flow diagrams (i.e., flow chart 500 and operations 502*a*-502*c*) may be performed in the order presented, in a different order or simultaneously. Further, in some embodiments, some of the actions, acts, blocks, steps, or the like may be omitted, added, modified, skipped, or the like without departing from the scope.

Referring to FIG. 5B, FIG. 5B is a flow chart of operation 502*a* illustrating various operations for creating and training the mutual data index based ML model, according to an embodiment as disclosed herein. The operations 502*aa*-502*ad* are performed by the mutual data index based ML engine 160.

At operation 502*aa*, the method includes obtaining the plurality of mutual data indexes from the plurality of users and objects. At operation 502*ab*, the method includes extracting the local special features from the mutual data index of each of the user using the kernel operations. At operation 502*ac*, the method includes generating the heat map and the probability of abnormal touch based on the local special features. At operation 502*ad*, the method includes creating and training the first ML model using the heat map and the probability of abnormal touch.

Referring to FIG. 5C, FIG. 5C is a flow chart of operation 502*b* illustrating various operations for creating and training the device feature based ML model, according to an embodiment as disclosed herein. The operations 502*ba*-502*be* are performed by the device feature based ML engine 170.

At operation 502*ba*, the method includes receiving the plurality of feature dataset. At operation 502*bb*, the method includes determining the optimal feature that changes the impurity of each column and each value in respective column of electrodes associated with each of the feature dataset. At operation 502*bc*, the method includes generating at least one rule to split the feature dataset based on the maximum depth associated with the optimal feature. At operation 502*bd*, the method includes generating the plurality of classifiers based on at least one rule. At operation 502*be*, the method includes creating and training the at least one second ML based on the plurality of classifiers.

Referring to FIG. 5D, FIG. 5D is a flow chart of operation 502*c* illustrating various operations for creating and training the ensemble based ML model, according to an embodiment of the disclosure. The operations 502*ca*-502*ce* are performed by the ensemble based ML engine 180.

At operation 502*ca*, the method includes obtaining the plurality of predefined accidental touch data and the plurality of predefined non-accidental touch data. At operation 502*cb*, the method includes obtaining the plurality of predefined electronic device features for the plurality of predefined accidental touch data and the plurality of predefined non-accidental touch data. At operation 502*cc*, the method includes building at least one classifier for the plurality of predefined electronic device features. At operation 502*cd*, the method includes simultaneously training at least one classifier for the plurality of predefined electronic device features. At operation 502*ce*, the method includes creating and training the at least one second ML model based on the at least one trained classifier.

FIG. 6A to FIG. 6F are example illustrations in which the creation and training of the mutual data index based ML model is depicted, according to various embodiments of the disclosure.

Referring to FIGS. 6A to 6F, the mutual data index based ML engine 160 obtains the plurality of mutual data indexes from the plurality of users and objects. The mutual data indexes depends on the resistance of the conductive object that comes in contact with the touch screen 140. In an example, the resistance of finger is 800-1600 ohms, resistance of the metal is 10-5-10-4 ohms, and resistance of water is 103-104 ohms. Each of the mutual data index indicates the sensor data corresponding to the user of the electronic devices. The mutual data index based ML engine 160 extracts the local special features from the mutual data index of each of the user. In an embodiment, there may be some objects present whose resistance is very close to that of finger or human touch but would change the mutual data grid spatially (size and values). In order to classify different hand/finger types, and to differentiate between substances with almost same resistance, a spatial correlation is necessary for the accuracy purpose. Convolution operation performs to identify the finger touch or object touch. Further, every finger would change the mutual data values differently based on the touch size, touch pressure, device temperature and water/salt content of blood etc. So the matrix of mutual data index vary because of these conditions.

Figure 6A:
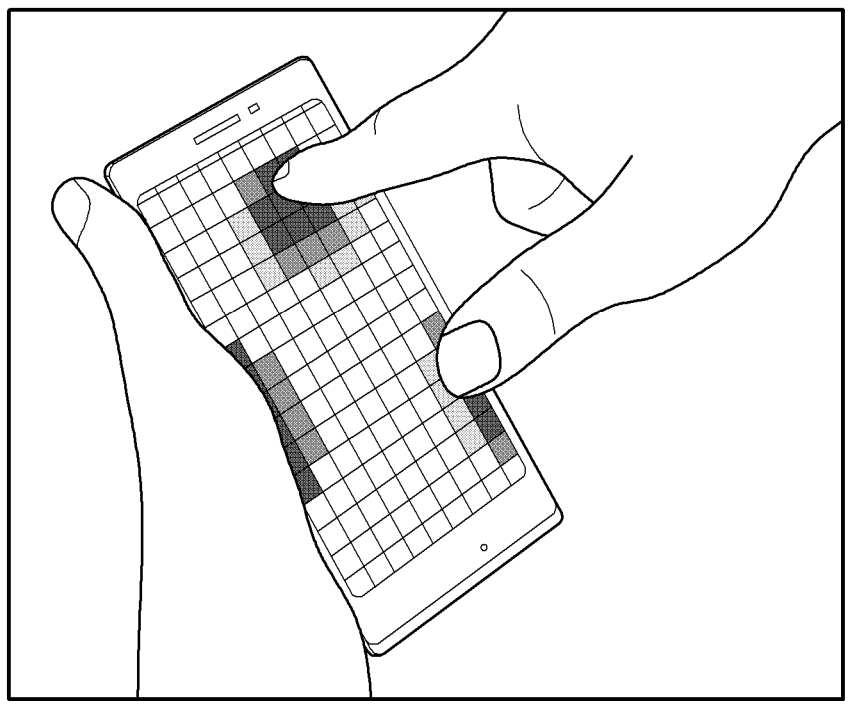
FIGS. 6A, 6BA, 6BB, 6C, 6D, 6E and 6F are example illustrations in which creation and training of the mutual data index based ML model is depicted, according to various embodiments of the disclosure.
Figure 6B:
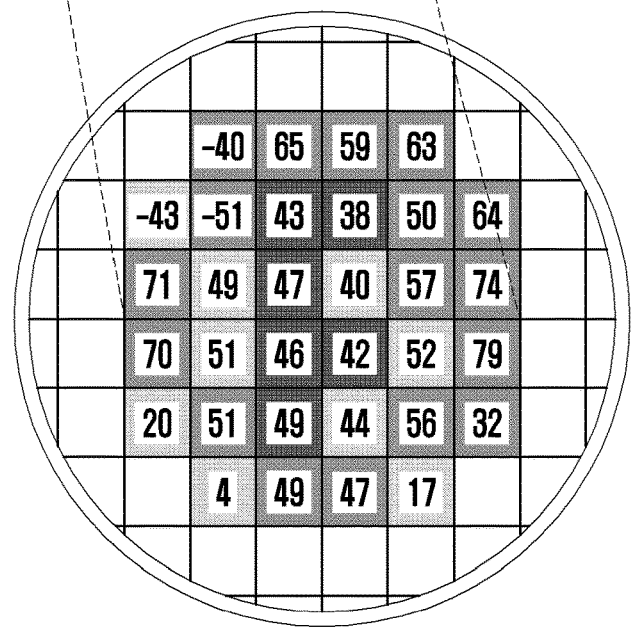
Figure 6B:
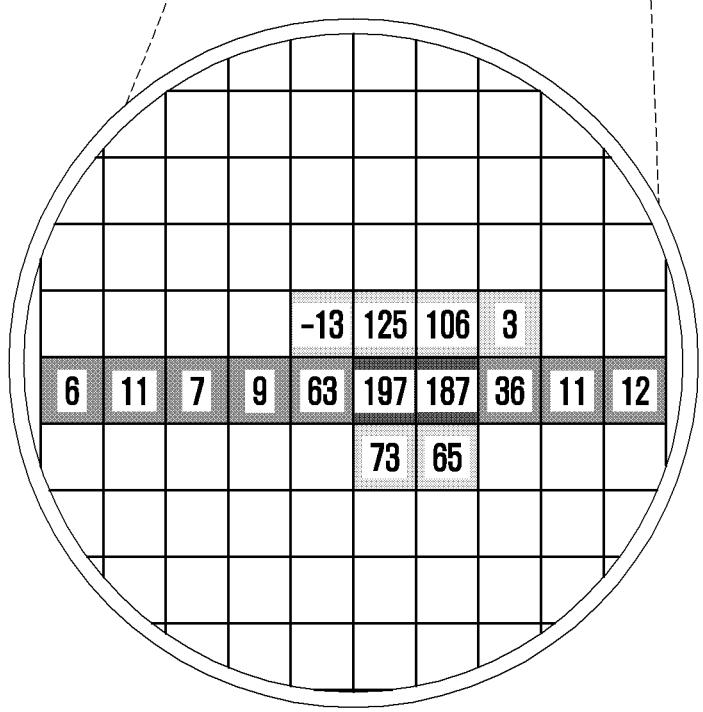

Referring to FIGS. 6BA and 6BB, the mutual data index based ML engine 160 generates the heat map and the probability of abnormal touch based on the local special features. The higher value in mutual data shows brighter colour and lower values shows dark colour. As shown in FIGS. 6BA and 6BB, the finger touch values lies between the objects which can give lower values of mutual data or higher values of mutual data. Also sometimes person finger resistance may vary because of which some values may coincide with the other upper or lower range. Statically it is difficult to determine whether the values corresponds to finger touch or some other object. Hence, the proposed method utilizes a convolution operation to understand the given matrices spatially. It compares the values of matrices while also considering its surrounding neighbors values.

Figure 6C:
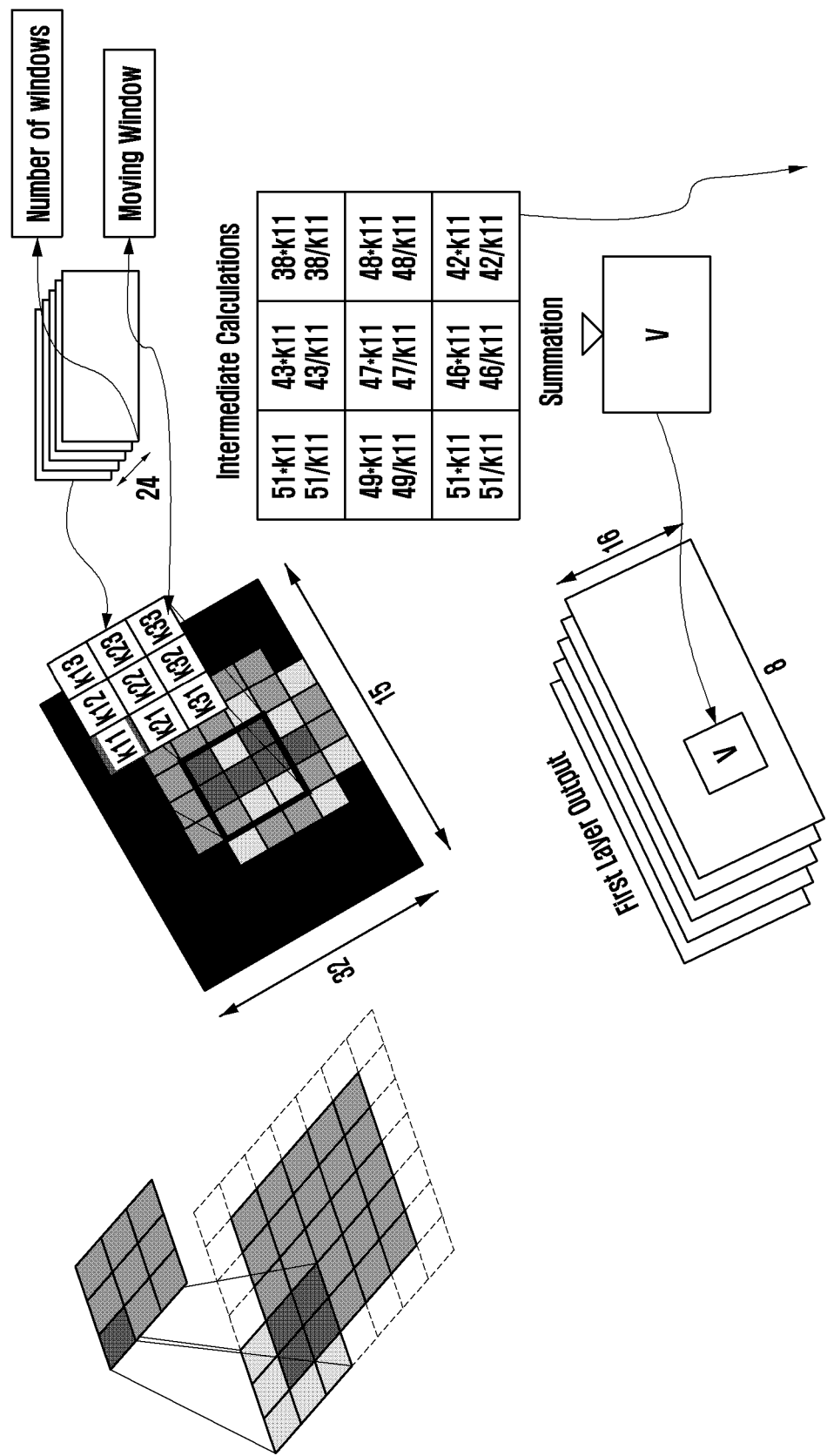

Referring to FIG. 6C, the kernel of size 3×3 is used to extract important features of change in mutual data values, on the basis of resistivity of finger or any other conducting object. Different objects change values differently which is captured by the kernel operation.

Figure 6D:
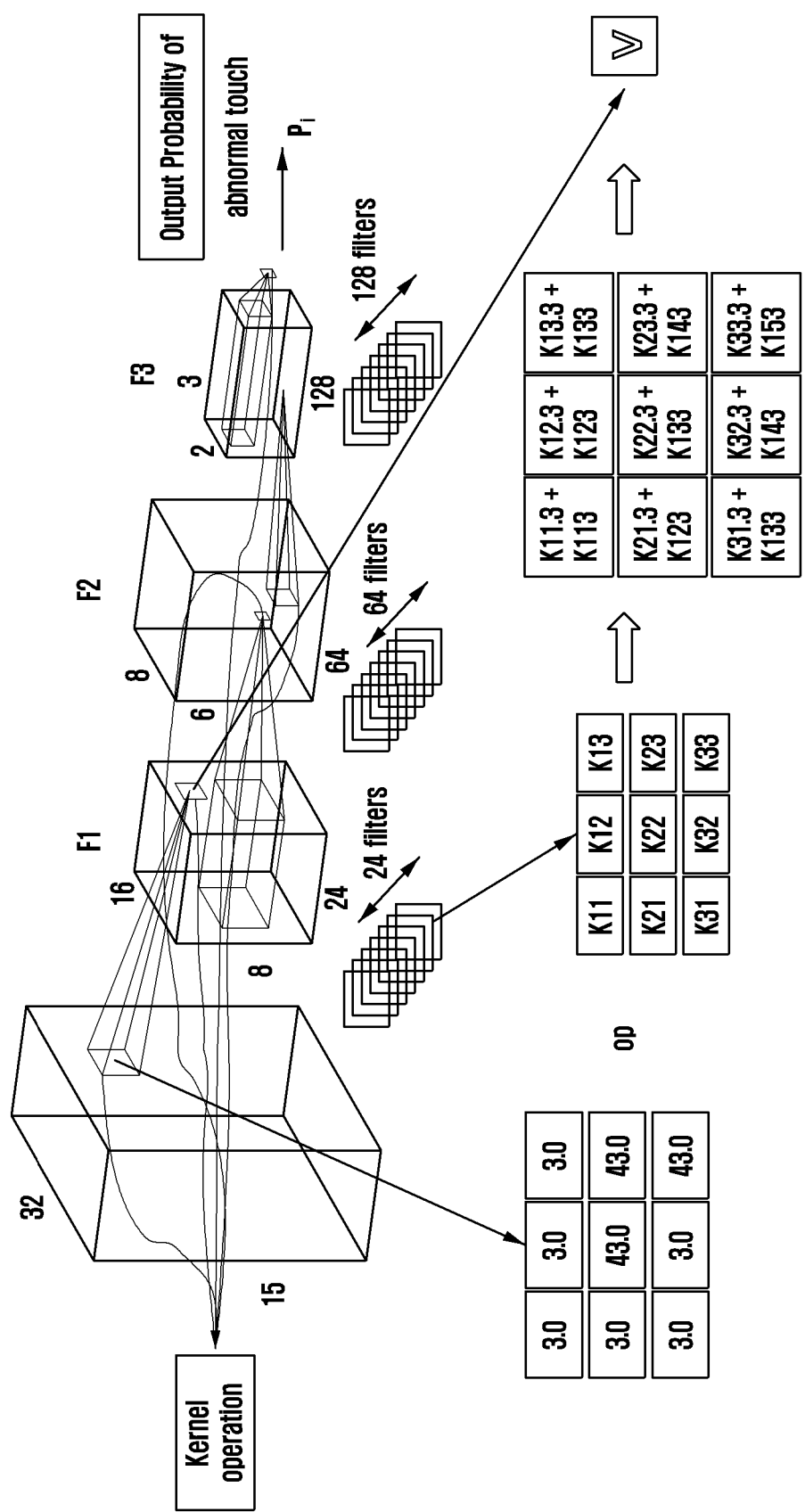
Figure 6E:
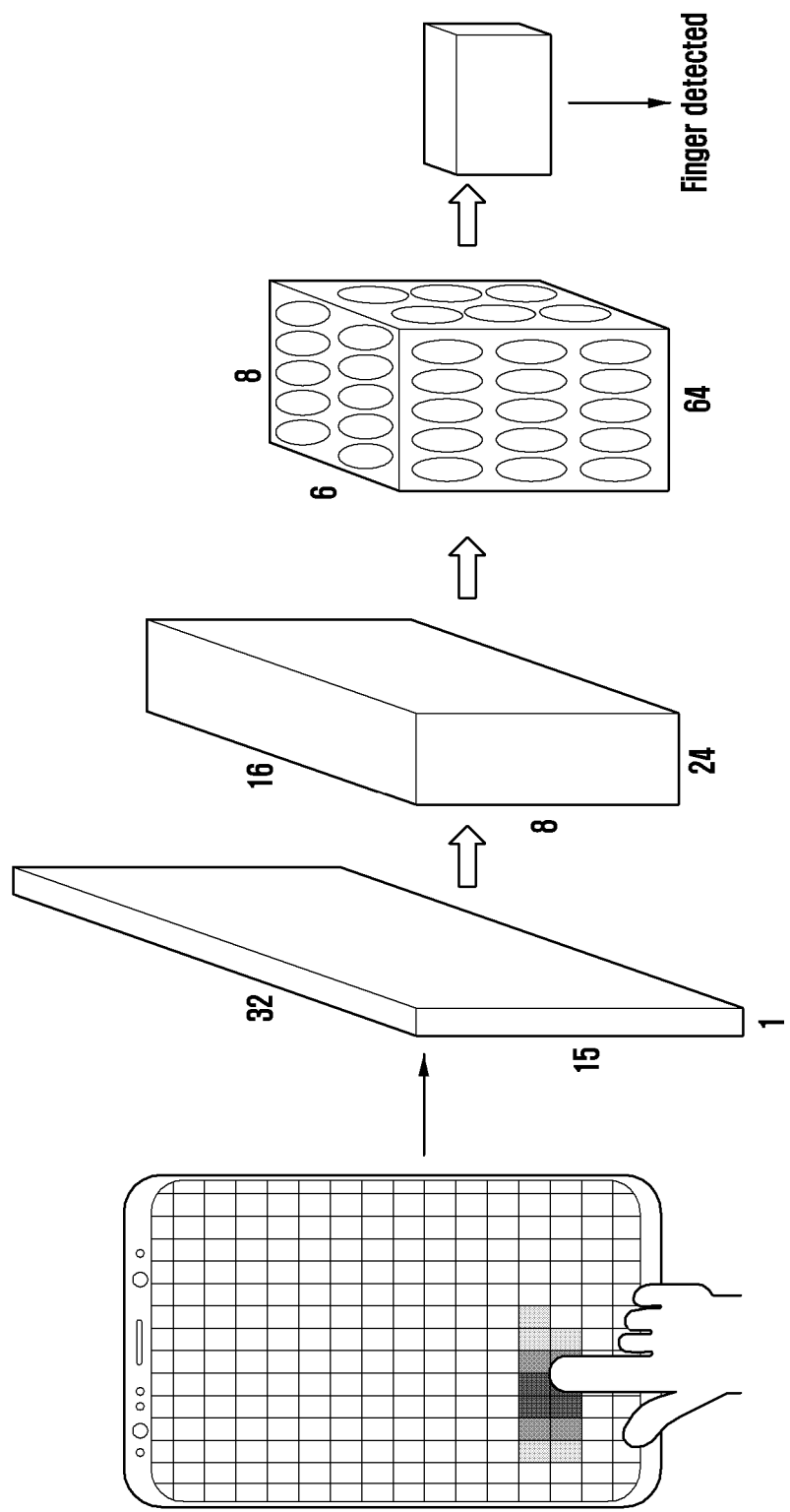
Figure 6F:
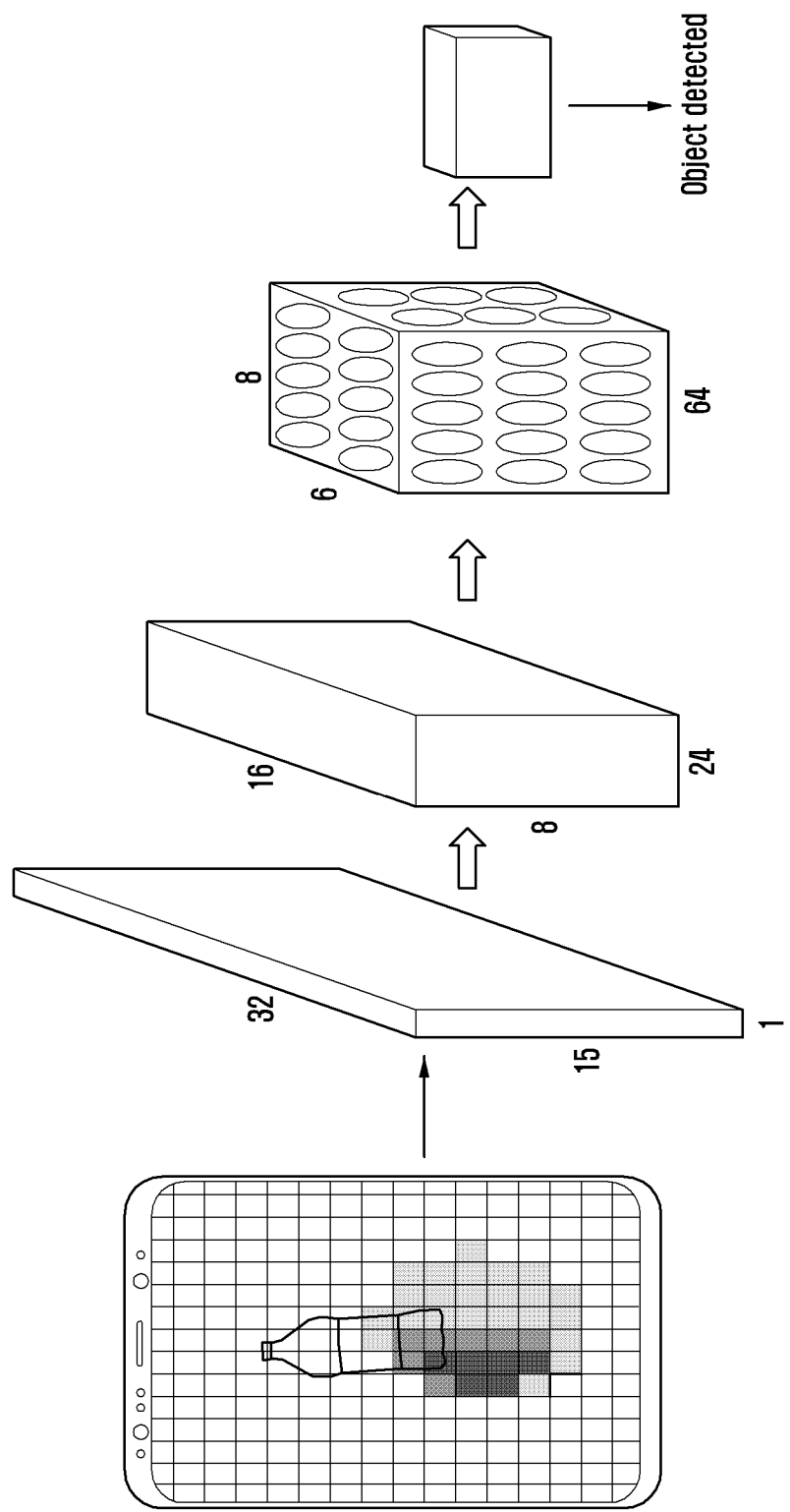

Referring to FIGS. 6D to 6F, the mutual data index based ML engine 160 creates and trains the mutual data index based ML model using the heat map and the probability of abnormal touch. Based on the created mutual data index based ML, the mutual data index based ML engine 160 classifies the non-object touch and the object touch.

32*16 mutual data matrix is obtained from the sensor data associated with the touch screen 140 and localized relationship of the 32*16 mutual data matrix is:

$$wcalited\ \text{Relation} = \left(x_{ij} - \frac{1}{n}\sum_{j=1}^{n} x_{ij}\right) \times \left(y_{ij} - \frac{1}{n}\sum_{j=1}^{n} y_{ij}\right)$$

A number of different kernels/filter is used to extract the local special features from the mutual data matrix. The kernels/filter are driven by using predefined true examples and each kernels/filter extract the different feature. In an example, there are some useful example in the mutual data matrix and the mutual data index based ML engine 160 calculates a relationship between a present row and next row at every $i^{th}$ row, then the feature looks like below matrix format:

$$\begin{pmatrix} & 0 & 1 & 2 & \ldots & & n & \\ 0 & 1 & 1 & 1 & \ldots & 1 & 1 & 1 \\ 1 & 0 & 0 & 0 & \ldots & 0 & 0 & 0 \\ 2 & 0 & 0 & 0 & \ldots & 0 & 0 & 0 \\ \vdots & \vdots & \vdots & \vdots & \ldots & \vdots & \vdots & \vdots \\ & 0 & 0 & 0 & \ldots & 0 & 0 & 0 \\ & 0 & 0 & 0 & \ldots & 0 & 0 & 0 \\ n & 1 & 1 & 1 & \ldots & 1 & 1 & 1 \end{pmatrix}$$

The kernels/filter is obtained from a deep network and is pre-trained on an integrated dataset. After applying successive filters, the mutual data index based ML engine 160 obtains the single value which probability value of the normal touch and the abnormal touch. As shown in FIG. 6D, the features F1, F2, F3 are learnt on the basis of values of finger touches using a back propagation procedure in a convolutional neural network. Every filter is applied on the (15, 32) grid with a shift of size (1, 1). Dot product of the filter with the grid gives single value on a single stride and such calculations are compiled to generate simpler representation images at every step. The featured extracted images are used to extract minute changes in two almost identical mutual data matrices of size (15, 32).

Figure 7A:
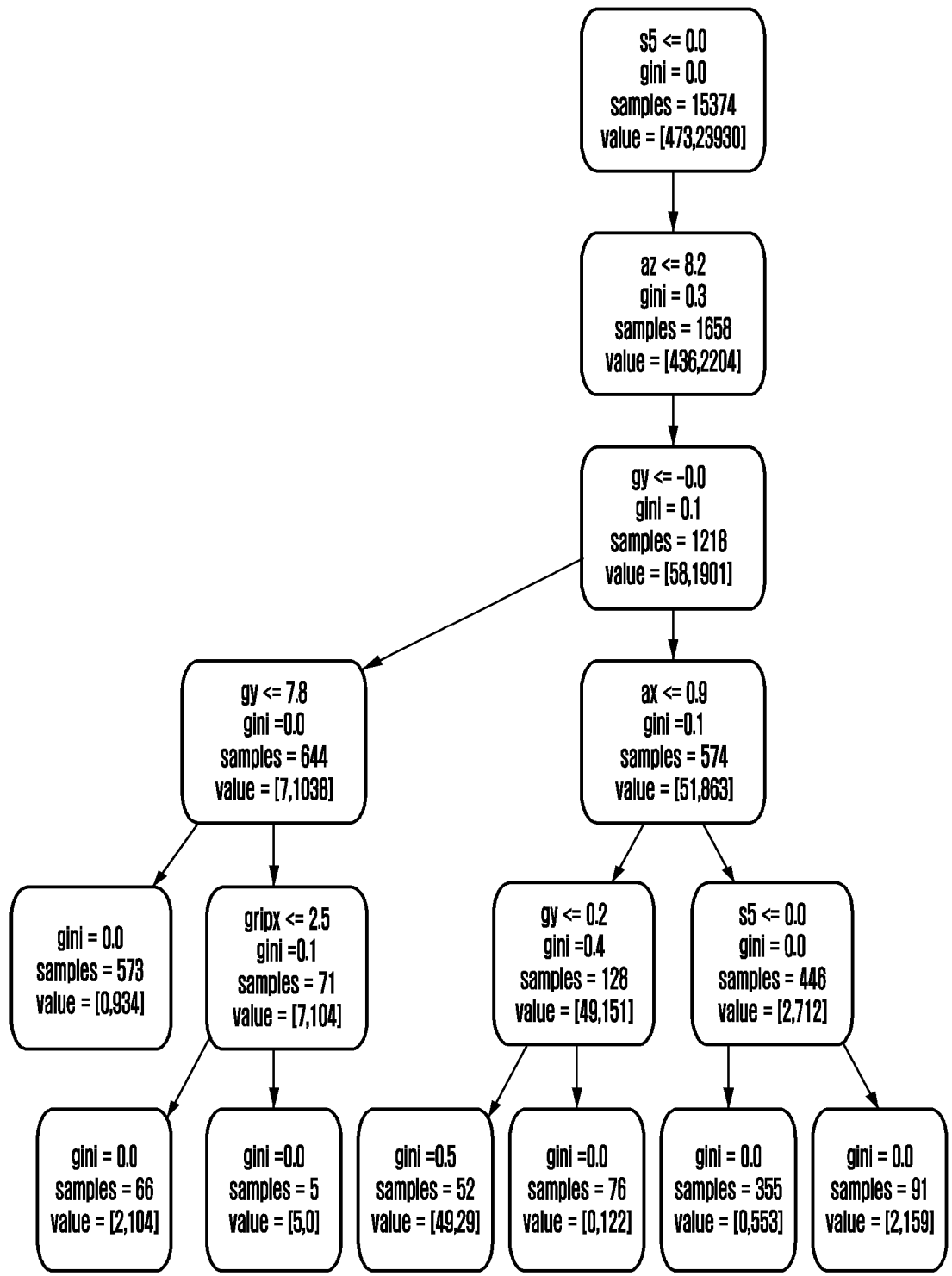
FIGS. 7A and 7B are example illustrations in which creation and training of the device feature based ML model is depicted, according to various embodiments of the disclosure.
Figure 7B:
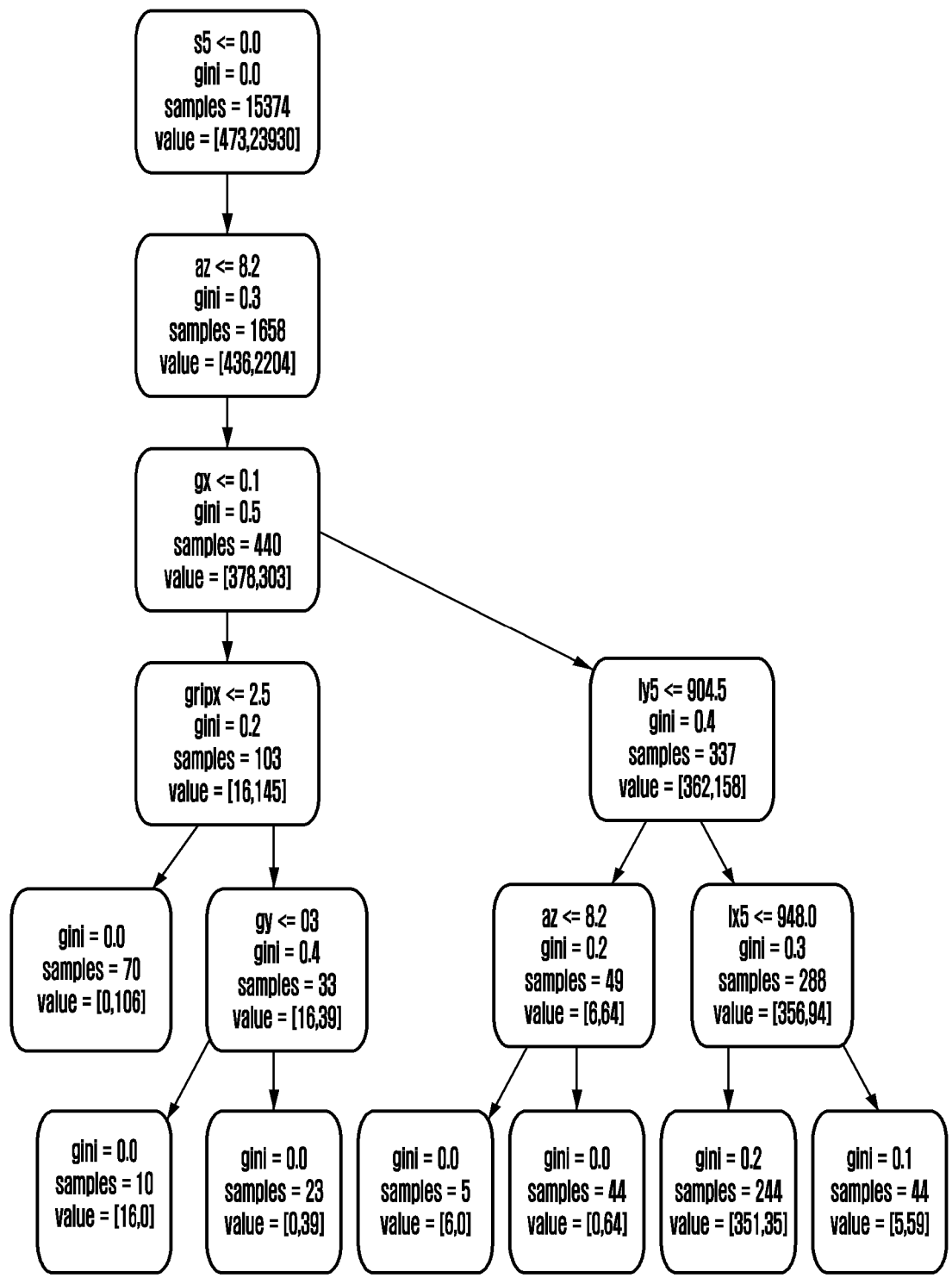

FIGS. 7A and 7B are example illustrations in which the creation and training of the device feature based ML model is depicted, according to various embodiments of the disclosure.

The creation and training of the device feature based ML is explained in conjunction with FIG. 5C. Referring to FIGS. 7A and 7B, a total of one hundred (100) rule based classifiers with maximum depth of 9 are used to learn the in-house developed feature dataset. The outputs of these one hundred (100) trees are then used to predict the correct output and hence different weightage for different trees' output is found. Given any input with all the features and engineered features, a decision is taken at the leaf node after going down the tree applying all the rules at respective node.

In an example, the device feature based ML engine 170 obtains a vector of 27 features for each touch. Now, the device feature based ML engine 170 determines whether the touch corresponds to the object touch and non-object touch. In order to determine the object touch and non-object touch, the device feature based ML engine 170 creates the rules which splits the plurality of feature dataset into two parts. Each rule is defined by a column of the table which provides the minimum impurity. The device feature based ML engine 170 takes the mid value of each column to make the rule to divide the feature dataset. In an example, consider, mid value of the column is x. If the value <x then, the device feature based ML engine 170 determines that the touch is normal touch. If the value is less than x then, the device feature based ML engine 170 determines that the touch is abnormal touch. The rule is used for determining the non-human touch data and the human touch data using the divided feature dataset.

The impurity of the split is a difference between a purity of a child and a purity of parent, where the child is the sub dataset after the split. The purity is an arithmetic sum of square of target values in a sub dataset.

Figure 8:
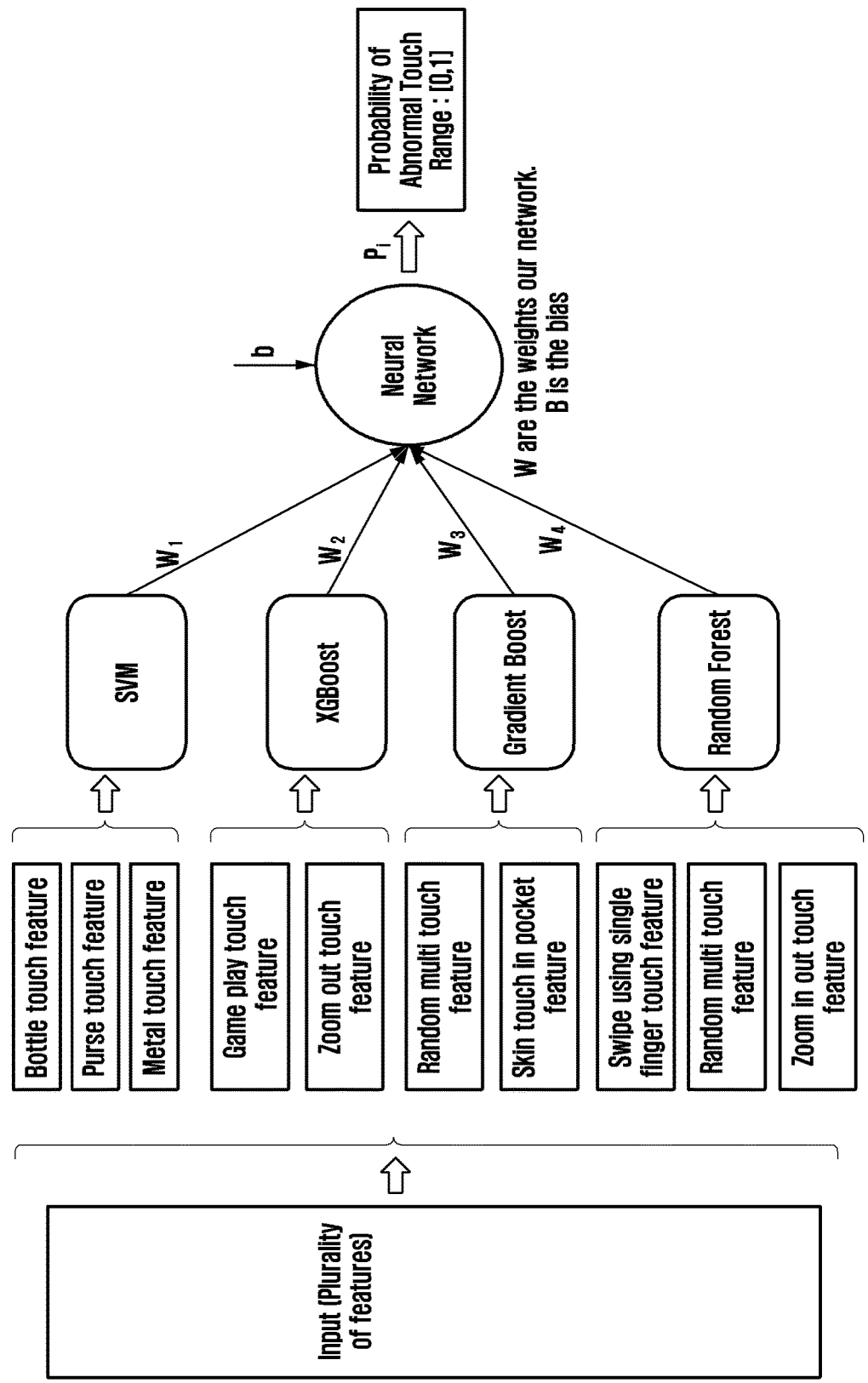
FIG. 8 is an example illustration in which creation and training of the device ensemble based ML model is depicted, according to an embodiment of the disclosure.

FIG. 8 is an example illustration in which the creation and training of the device ensemble based ML model is depicted, according to an embodiment of the disclosure.

Referring to FIG. 8, the ensemble based ML engine 180 obtains the plurality of predefined electronic device features for the plurality of predefined accidental touch data and the plurality of predefined non-accidental touch data. Further, the ensemble based ML engine 180 builds at least one classifier for the plurality of predefined electronic device features using the multiple neural network at various layers. Further, the ensemble based ML engine 180 simultaneously trains at least one classifier for the plurality of predefined electronic device features. Further, the ensemble based ML engine 180 creates and train the at least one second ML model based on the at least one trained classifier by using the multiple neural network at various layers.

The weight factor of the neural network are decided based on multiple factors:

$$MW_i = W_i + \alpha*(R_{Vi})^{-1} + \beta*(T_{ei})^{-1} + \gamma*U_{Ri},$$

wherein MWi is model weights, $T_{ei}$ is training error of model, $R_{Vi}$ is mean runtime for validation set, and $U_{Ri}$ is update time of model parameters, $\alpha=0.5$, $\beta=0.4$, and $\gamma=0.2$.

The weight factors for the ensemble based ML model is determined. The weight factors are multiplication coefficient which are then multiplied to output of each model and the mean of this result of all models is taken which then gives the probability output. The probability is compared with a threshold value which is set by experimentation value. The final probability value greater or less than the threshold value will determine whether the touch is normal touch or abnormal touch.

The embodiments disclosed herein can be implemented using at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for accidental touch prediction using machine learning (ML) classification by an electronic device, the method comprising:
   capturing, by the electronic device, sensor data corresponding to a touch on a touch screen of the electronic device;
   determining, by the electronic device, a mutual data index of the sensor data using a first ML model;
   recognizing, by the electronic device, whether the sensor data corresponds to an object touch or a non-object touch based on the mutual data index; and
   performing, by the electronic device, one of:
      in response to determining that the sensor data corresponds to the object touch, detecting that the electronic device is in a pocket mode and providing an object touch notification, or
      in response to determining that the sensor data corresponds to the non-object touch, recognizing whether the sensor data corresponds to an accidental touch or a non-accidental touch using at least one second ML model.

2. The method of claim 1, wherein the recognizing of whether the sensor data corresponds to the object touch or the non-object touch based on the mutual data index comprises:
   extracting a relationship among mutual data indices;
   determining probability information based on the relationship;
   determining whether the probability information exceeds a probability criterion; and
   performing one of:
      in response to determining that the probability information does not exceed the probability criterion, recognizing that the sensor data corresponds to the object touch, or
      in response to determining that the probability information exceeds the probability criterion, recognizing that the sensor data corresponds to the non-object touch.

3. The method of claim 1, wherein the recognizing of whether the sensor data corresponds to the accidental touch or the non-accidental touch using the at least one second ML model comprises:
   classifying the sensor data by running the at least one second ML model using one or more electronic device features with the mutual data index;
   determining whether the sensor data corresponds to the accidental touch or non-accidental touch using the at least one second ML model based on the classifying;
   in response to determining that the sensor data corresponds the non-accidental touch, detecting that the electronic device is in a non-pocket mode; and
   in response to determining that the sensor data corresponds to the accidental touch, determining luminance information of the electronic device and detecting whether the electronic device is in the pocket mode or the non-pocket mode based on the luminance information of the electronic device.

4. The method of claim 3, wherein the detecting of whether the electronic device is in the pocket mode or the non-pocket mode based on the luminance information of the electronic device comprises:
   determining whether the luminance information meets a luminance criterion; and
   performing one of:
      in response to determining that the luminance information meets the luminance criterion, detecting that the electronic device is in the non- pocket mode, or
      in response to determining that the luminance information does not meet the luminance criterion, detecting that the electronic device is in the pocket mode and providing an accidental touch notification.

5. The method of claim 1,
wherein the recognizing of whether the sensor data corresponds to the accidental touch or the non-accidental touch using the at least one second ML model comprises:
   classifying the sensor data by executing the at least one second ML model, the at least one second ML model comprising at least one of a random forest neural network, an extreme gradient boosting tree neural network, a gradient boosting tree neural network, or a support vector machine neural network;
   determining whether the sensor data corresponds to the accidental touch or the non-accidental touch using the at least one second ML model based on the classifying;
   in response to determining that the sensor data corresponds the non-accidental touch, detecting that the electronic device is in the pocket mode; and
   in response to determining that the sensor data corresponds to the accidental touch, determining probability information associated with the at least one second ML model and detecting whether the electronic device is in the pocket mode or a non-pocket mode based on the probability information, and
wherein the probability information is obtained based on a weightage factor comprising at least one of a training error value associated with the at least one second ML model, a mean runtime value of a validation set associated with the at least one second ML model, or an update time of a model parameter associated with the at least one second ML model.

6. The method of claim 5, wherein the detecting of whether the electronic device is in the pocket mode or the non-pocket mode based on the probability information comprises:
   determining whether the probability information meets a probability criterion; and
   performing one of:
      in response to determining that the probability information meets the probability criterion, detecting that the electronic device is in the non-pocket mode, or
      in response to determining that the probability information does not meet the probability criterion, detecting that the electronic device is in the pocket mode and providing an accidental touch notification.

7. The method of claim 1, wherein the mutual data index indicates a resistance of a conductive object or a finger of a user that comes in contact with the touch screen of the electronic device.

8. The method of claim 1, wherein the first ML model is created and trained by:
   obtaining a plurality of mutual data indices from a plurality of users and objects, each mutual data index indicating the sensor data corresponding to electronic devices of a user and objects;
   extracting local special features from the mutual data index of each user using a kernel operation, the local special features being extracted based on a resistivity of a finger or a resistivity of an object that comes in contact with the touch screen of the electronic device;

generating a heat map and a probability of an abnormal touch based on the local special features; and creating and training the first ML model using the heat map and the probability of the abnormal touch.

9. The method of claim 1, wherein the at least one second ML model is created and trained by:

receiving a plurality of feature datasets;

determining an optimal feature that changes an impurity of each column and each value in respective columns of electrodes associated with each feature dataset;

generating at least one rule to split each feature dataset based on a maximum depth associated with the optimal feature;

generating a plurality of classifiers based on the at least one rule; and creating and training the at least one second ML based on the plurality of classifiers.

10. The method of claim 1, wherein the at least one second ML model is created and trained by:

obtaining data of a plurality of predefined accidental touches and data of a plurality of predefined non-accidental touches;

obtaining a plurality of predefined electronic device features for the data of the plurality of predefined accidental touches and the data of the plurality of predefined non-accidental touches;

building at least one classifier for the plurality of predefined electronic device features;

simultaneously training the at least one classifier for the plurality of predefined electronic device features; and creating and training the at least one second ML model based on the at least one trained classifier.

11. The method of claim 1, further comprising, in response to determining that the sensor data corresponds to the object touch, determining, by the electronic device, a damage to the touch screen of the electronic device based on the object touch and providing an objection damage notification.

12. An electronic device for accidental touch prediction using machine learning (ML) classification, the electronic device comprising:

a memory;

a touch screen; and at least one processor coupled with the memory and the touch screen, the at least one processor being configured to:

capture sensor data corresponding to a touch on the touch screen, determine a mutual data index of the sensor data using a first ML model, recognize whether the sensor data corresponds to an object touch or a non-object touch based on the mutual data index, and perform one of:

in response to determining that the sensor data corresponds to the object touch, detect that the electronic device is in a pocket mode and provide an object touch notification; or in response to determining that the sensor data corresponds to the non-object touch, recognize whether the sensor data corresponds to an accidental touch or a non-accidental touch using at least one second ML model.

13. The electronic device of claim 12, wherein, to recognize whether the sensor data corresponds to the object touch or the non-object touch based on the mutual data index, the at least one processor is further configured to:

extract a relationship among mutual data indices, determine probability information based on the relationship, determine whether the probability information exceeds a probability criteria criterion, and perform one of:

in response to determining that the probability information does not exceed the probability criterion, recognize that the sensor data corresponds to the object touch; or in response to determining that the probability information exceeds the probability criterion, recognize that the sensor data corresponds to the non-object touch.

14. The electronic device of claim 12, wherein, to recognize whether the sensor data corresponds to the accidental touch or the non-accidental touch using the at least one second ML model, the at least one processor is further configured to:

classify the sensor data by running the at least one second ML model using one or more electronic device features with the mutual data index, determine whether the sensor data corresponds to the accidental touch or non-accidental touch using the at least one second ML model based on the classifying, in response to determining that the sensor data corresponds the non-accidental touch, detect that the electronic device is in a non-pocket mode, and in response to determining that the sensor data corresponds to the accidental touch, determine luminance information of the electronic device and detect whether the electronic device is in the pocket mode or the non-pocket mode based on the luminance information of the electronic device.

15. The electronic device of claim 14, wherein, to detect whether the electronic device is in the pocket mode or the non-pocket mode based on the luminance information of the electronic device, the at least one processor is further configured to:

determine whether the luminance information meets a luminance criterion, and perform one of:

in response to determining that the luminance information meets the luminance criterion, detect that the electronic device is in the non-pocket mode; or in response to determining that the luminance information does not meet the luminance criterion, detect that the electronic device is in the pocket mode and provide an accidental touch notification.

16. The electronic device of claim 12, wherein, to recognize whether the sensor data corresponds to the accidental touch or the non-accidental touch using the at least one second ML model, the at least one processor is further configured to:

classify the sensor data by executing the at least one second ML model, the at least one second ML model comprising at least one a random forest neural network, an extreme gradient boosting tree neural network, a gradient boosting tree neural network, or a support vector machine neural network, determine whether the sensor data corresponds to the accidental touch or the non-accidental touch using the at least one second ML model based on the classifying, in response to determining that the sensor data corresponds the non-accidental touch, detect that the electronic device is in the pocket mode, and in response to determining that the sensor data corresponds to the accidental touch, determine probability information associated with the at least one second ML model and detect whether the electronic device is in the pocket mode or a non-pocket mode based on the probability information, and wherein the probability information is obtained based on a weightage factor comprising at least one of a training error value associated with the at least one second ML model, a mean runtime value of a validation set associated with the at least one second ML model, or an update time of a model parameter associated with the at least one second ML model.

17. The electronic device of claim 16, wherein, to detect whether the electronic device is in the pocket mode or the non-pocket mode based on the probability information, the at least one processor is further configured to:

determine whether the probability information meets a probability criterion, and perform one of:
in response to determining that the probability information meets the probability criterion, detect that the electronic device is in the non-pocket mode; or
in response to determining that the probability information does not meet the probability criterion, detect that the electronic device is in the pocket mode and provide an accidental touch notification.

18. The electronic device of claim 12, wherein the mutual data index indicates a resistance of a conductive object or a finger of a user that comes in contact with the touch screen of the electronic device.

19. The electronic device of claim 12,
wherein the at least one processor is further configured to create and train the first ML model, and
wherein, to create and train the first ML model, the at least one processor is further configured to:
obtain a plurality of mutual data indices from a plurality of users and objects, each mutual data index indicating the sensor data corresponding to electronic devices of a user and objects,
extract local special features from the mutual data index of each user using a kernel operation, the local special features being extracted based on a resistivity of a finger or a resistivity of an object that comes in contact with the touch screen of the electronic device,
generate a heat map and a probability of an abnormal touch based on the local special features, and
create and train the first ML mode using the heat map and the probability of an abnormal touch.

20. The electronic device of claim 12,
wherein the at least one processor is further configured to create and train the at least one second ML model, and
wherein, to create and train the at least one second ML model, the at least one processor is further configured to:
receive a plurality of feature datasets,
determine an optimal feature that changes an impurity of each column and each value in respective columns of electrodes associated with each feature dataset,
generate at least one rule to split each feature dataset based on a maximum depth associated with the optimal feature,
generate a plurality of classifiers based on the at least one rule, and
create and train the at least one second ML based on the plurality of classifiers.

21. The electronic device of claim 12,
wherein the at least one processor is further configured to create and train the at least one second ML model, and
wherein, to create and train the at least one second ML model, the at least one processor is further configured to:
obtain data of a plurality of predefined accidental touches and data of a plurality of predefined non-accidental touches,
obtain a plurality of predefined electronic device features for the data of the plurality of predefined accidental touches and the data of the plurality of predefined non-accidental touches,
build at least one classifier for the plurality of predefined electronic device features,
simultaneously train the at least one classifier for the plurality of predefined electronic device features, and
create and train the at least one second ML model based on the at least one trained classifier.

22. The electronic device of claim 12, wherein the at least one processor is further configured to, in response to determining that the sensor data corresponds to the object touch, determine a damage to the touch screen of the electronic device based on the object touch and provide an objection damage notification.

* * * * *